(12) United States Patent
Hirano et al.

(10) Patent No.: US 11,503,463 B2
(45) Date of Patent: Nov. 15, 2022

(54) WIRELESS COMMUNICATION APPARATUS AND METHOD

(71) Applicant: KABUSHIKI KAISHA TOSHIBA, Tokyo (JP)

(72) Inventors: Tatsuma Hirano, Kawasaki Kanagawa (JP); Masahiro Sekiya, Tokyo (JP); Toshihisa Nabetani, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 87 days.

(21) Appl. No.: 17/187,948

(22) Filed: Mar. 1, 2021

(65) Prior Publication Data
US 2021/0360396 A1 Nov. 18, 2021

(30) Foreign Application Priority Data
May 15, 2020 (JP) .............................. JP2020-085855

(51) Int. Cl.
*H04L 9/08* (2006.01)
*H04L 9/32* (2006.01)
*H04L 9/00* (2022.01)
*H04L 9/06* (2006.01)
*H04L 9/40* (2022.01)
*H04W 12/041* (2021.01)
*H04W 12/069* (2021.01)
(Continued)

(52) U.S. Cl.
CPC ......... *H04W 12/041* (2021.01); *H04L 9/0822* (2013.01); *H04W 12/069* (2021.01); *H04W 72/005* (2013.01)

(58) Field of Classification Search
CPC ............. H04W 12/041; H04W 12/069; H04W 12/106; H04W 72/005; H04L 9/0822; H04L 9/3242; H04L 9/50; H04L 9/0643; H04L 63/123; H04L 2209/80
See application file for complete search history.

(56) References Cited

U.S. PATENT DOCUMENTS

| 8,189,517 | B2 * | 5/2012 | Benveniste | ....... H04W 72/0406 370/348 |
| 9,699,654 | B2 * | 7/2017 | Lee | ........................ H04W 12/06 |
| 2010/0185748 | A1 * | 7/2010 | Ishii | ............... H04N 21/234318 709/219 |

OTHER PUBLICATIONS

Morioka, "eBCS Frame Authentication Proposal", IDS dated Mar. 1, 2021 (Year: 2019).*

(Continued)

*Primary Examiner* — Fatoumata Traore
*Assistant Examiner* — Hamid Talaminaei
(74) *Attorney, Agent, or Firm* — Holtz, Holtz & Volek PC

(57) ABSTRACT

According to one embodiment, a wireless communication apparatus includes a transmitter. The transmitter transmits, in a first period, a first information frame. The first information frame includes first, verification information and a first key usable in the first period. The transmitter transmits, in the first period and after transmitting the first information frame, a data frame including first data. The transmitter transmits, in the first period and after transmitting the first information frame, a second information frame. The data frame includes a fourth key usable in a second period following the first period. The transmitter transmits, in the second period, a third information frame including third verification information and the fourth key.

24 Claims, 19 Drawing Sheets

(51) Int. Cl.
 _H04W 12/106_  (2021.01)
 _H04W 72/00_  (2009.01)

(56) References Cited

OTHER PUBLICATIONS

Morioka, "eBCS Frame Authentication Proposal", downloaded on Apr. 15, 2020 from: https://mentor.ieee.org/802.11/dcn/19/11-19-0451-05-00bc-ebcs-frame-authentication-proposal.pptx, Sep. 24, 2019, p. 1-39.

* cited by examiner

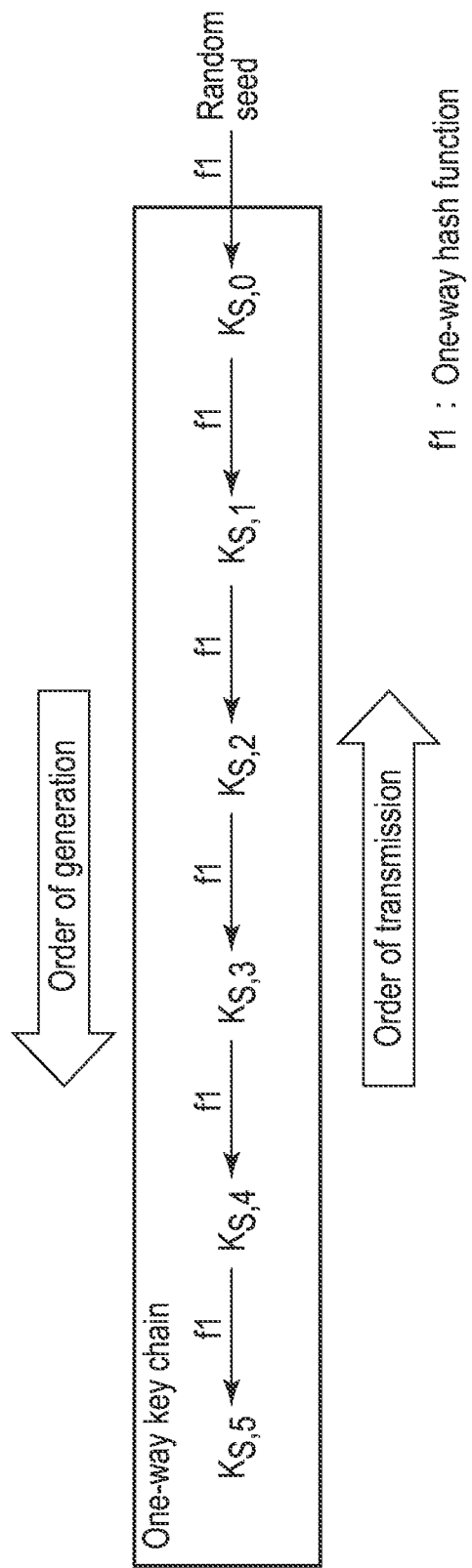
F I G. 4

Head information frame

- Key $K_{S,N-1}$
- Key $K_{S-1,0}$
- Key $K_{S-1,1}$
- Time stamp
- Transmission interval of head information frame $T_I$
- Key change interval $T_K$
- Key delay interval d
- Sequence number S
- Public key of base station with certification by certificate authority
- Digital signature by private key of base station

FIG. 5

Data frame

- Key $K_{S,i+2}$
- Authentication code $A_{S,i}$
- Key index i corresponding to authentication code $A_{S,i}$
- Sequence number S
- Data portion

FIG. 6

Additional information frame

- Key $K_{S,i+2}$
- Authentication code $A_{S,i}$
- Key index i corresponding to authentication code $A_{S,i}$

- Time stamp
- Transmission interval of head information frame $T_I$
- Key change interval $T_K$
- Key delay interval d
- Sequence number S+1
- Public key of base station with certification by certificate authority
- Digital signature by private key of base station

- Key $K_{S+1,N-1}$
- Key $K_{S,0}$
- Key $K_{S,1}$

FIG. 7

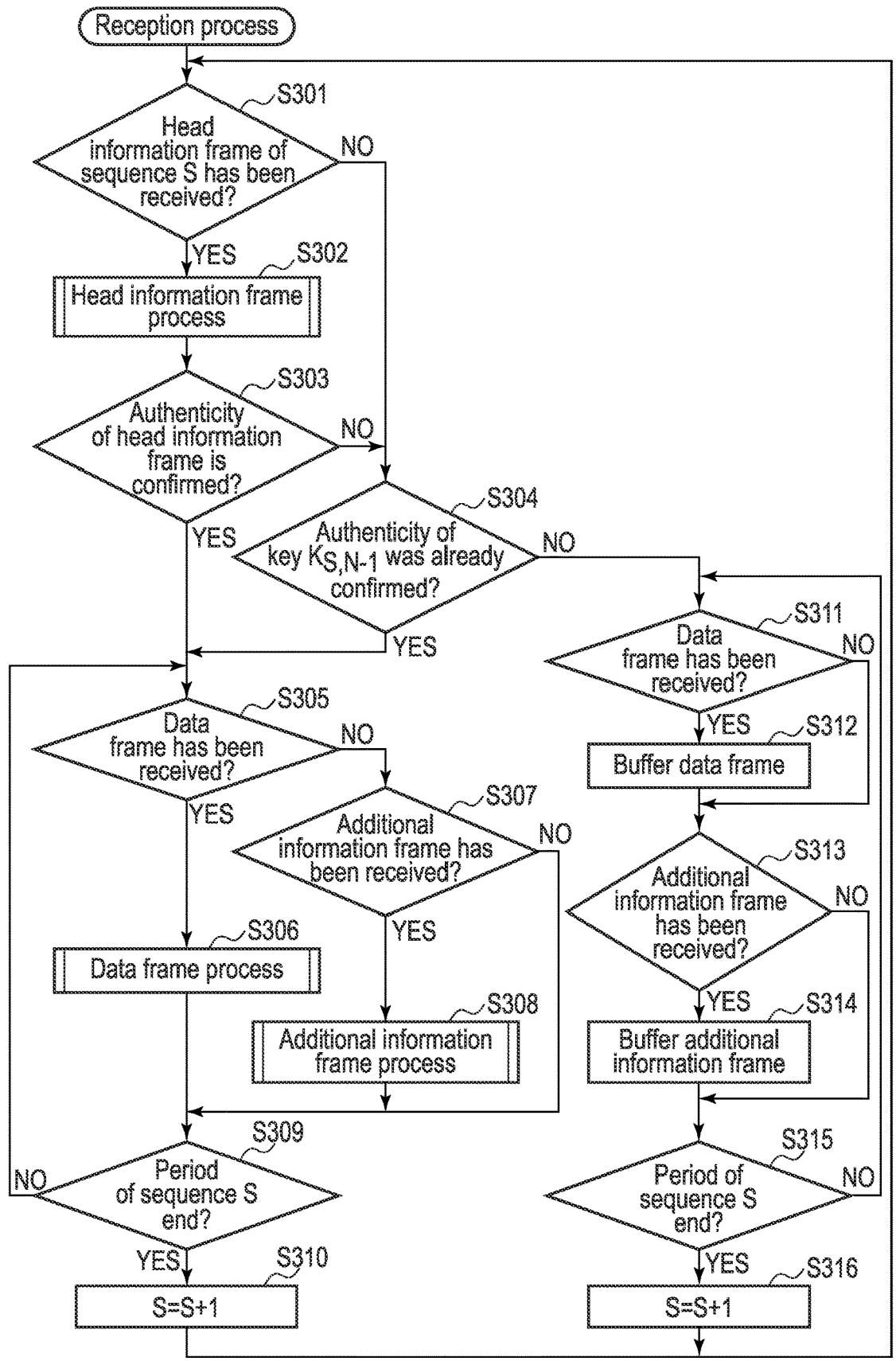
F I G. 12

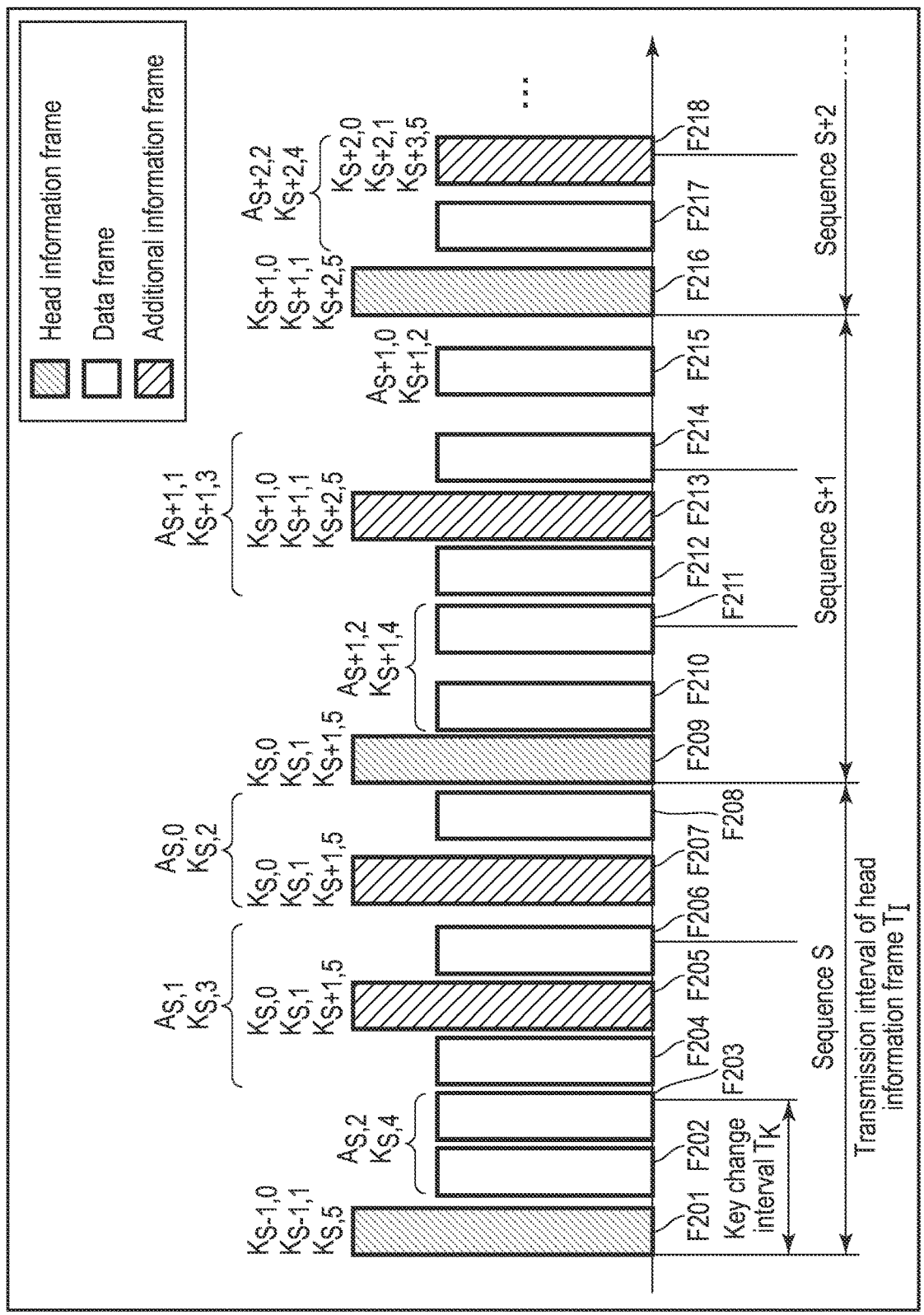
F I G. 20

WIRELESS COMMUNICATION APPARATUS AND METHOD

CROSS-REFERENCE TO RELATED APPLICATIONS

This application is based upon and claims the benefit of priority from Japanese Patent Application No. 2020-085855, filed May 15, 2020, the entire contents of which are incorporated herein by reference.

FIELD

Embodiments described herein relate generally to wireless communication.

BACKGROUND

IEEE 802.11bc is one of next generation wireless local area network (LAN) standards. In IEEE 802.11bc, a method of transmitting data with broadcasting from a wireless base station (access point: AP) to many wireless terminals (stations: STAs) without performing association processes to establish communication links has been considered. For example, the AP broadcasts data for real-time distribution of events such as sports and concert to the STAs in a stadium.

Each wireless terminal receives not only the data but also information to verify the security of the wireless base station and the authenticity of the data (hereinafter referred to as verification information) from the wireless base station. The wireless terminal verifies the security of wireless base station and the authenticity of the data using the verification information. The wireless terminal can properly operate with the data authenticity of which is confirmed, that is received from the wireless base station security of which is confirmed.

However, when the reception of the verification information is not successful, the wireless terminal cannot verify the security of the wireless base station and the authenticity of the data. When falling to receive the verification information, the wireless terminal cannot verify the authenticity of the received data, and thus, the wireless terminal may not acquire data correctly. Alternatively, since the wireless terminal cannot verify the authenticity of the received data until receiving verification information from the wireless base station next time, a time to acquire data may be delayed.

Thus, a new function to increase a possibility of correctly acquiring data is required.

BRIEF DESCRIPTION OF THE DRAWINGS

FIG. 4 is a diagram illustrating an example of a one-way key chain used by the wireless communication apparatus of the embodiment.

FIG. 5 is a diagram illustrating a configuration example of a head information frame transferred between the wireless communication apparatuses of the embodiment.

FIG. 6 is a diagram illustrating a configuration example of a data frame transferred between the wireless communication apparatuses of the embodiment.

FIG. 7 is a diagram illustrating a configuration example of an additional information frame transferred between the wireless communication apparatuses of the embodiment.

FIG. 12 is a flowchart of an example of the procedure of a reception process executed in the receiver wireless communication apparatus of FIG. 3.

FIG. 20 is a diagram illustrating an example of frame sequences transferred between wireless communication apparatuses according to another variation of the embodiment.

DETAILED DESCRIPTION

Various embodiments will be described hereinafter with reference to the accompanying drawings.

In general, according to one embodiment, a wireless communication apparatus includes a transmitter. The transmitter transmits, in a first period, a first information frame with broadcasting, the first information frame including first verification information and a first key usable in the first period. The transmitter transmits, in the first period and after transmitting the first information frame, a data frame including first data with broadcasting. The transmitter transmits, in the first period and after transmitting the first information frame, a second information frame with broadcasting. The second information frame includes a fourth key usable in a second period following the first period. The transmitter transmits, in the second period, a third information frame with broadcasting. The third information frame includes third verification information and the fourth key.

Figure 1:
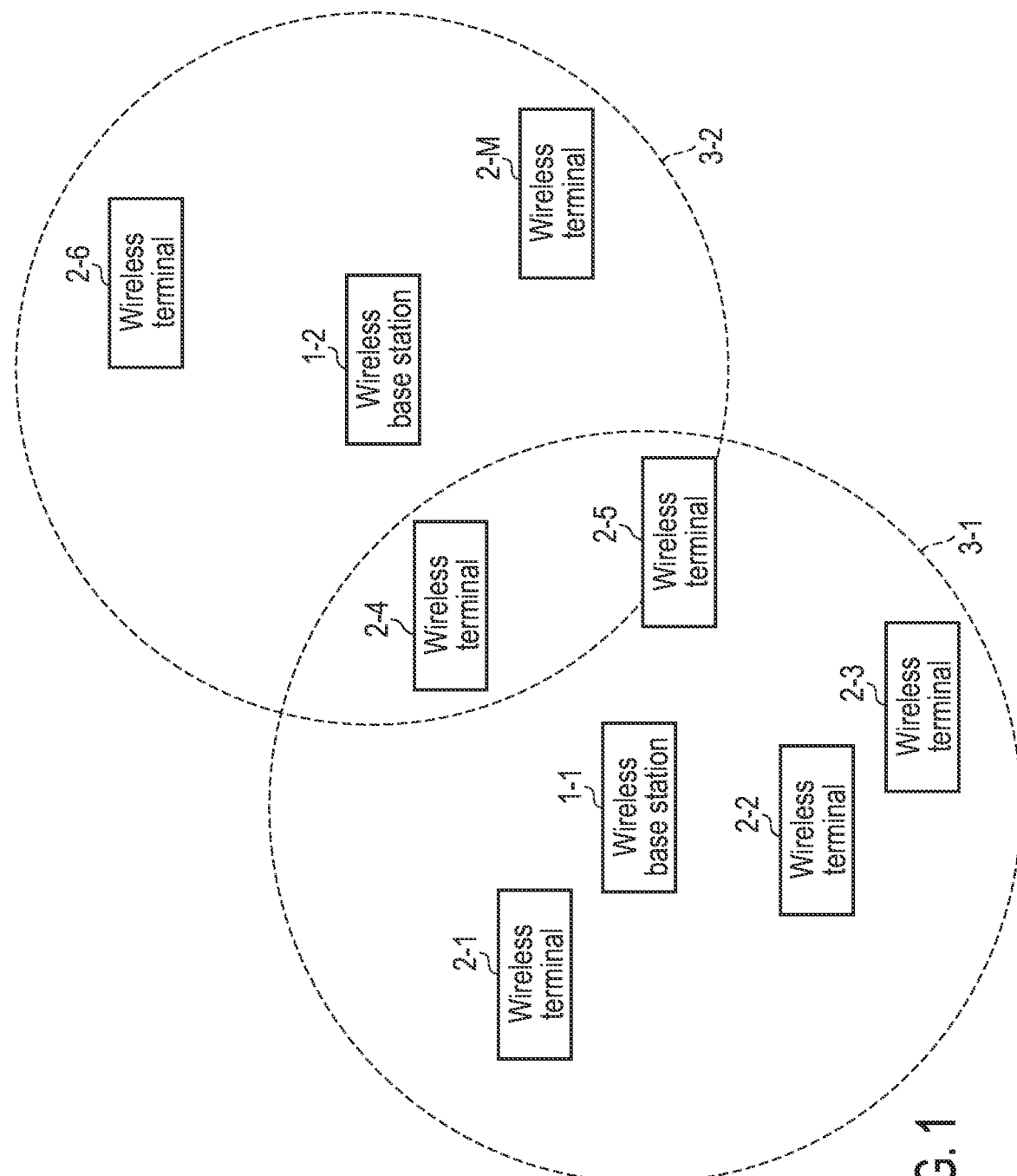
FIG. 1 is a block diagram illustrating a configuration example of a wireless communication system including a wireless communication apparatus according to an embodiment.

A configuration example of a wireless system including a wireless communication apparatus according to an embodiment will be explained with reference to FIG. 1. The wireless system includes one or more wireless base stations 1-1 and 1-2 (access points: APs) and one or more wireless terminals 2-1, 2-2, 2-3, 2-4, 2-5, 2-6, . . . , 2-M (stations: STAs). In the wireless system, data is transmitted with broadcasting from the wireless base stations 1-1, 1-2 to the wireless terminals 2-1, 2-2, 2-3, 2-4, 2-5, 2-6, . . . , 2-M without performing association processes to establish communication links. Such a wireless system is used in, for example, a large location such as a stadium to perform real-time distribution of video of an event such as sports or concert to many wireless terminals 2-1, 2-2, 2-3, 2-4, 2-5, 2-6, . . . , 2-M from multiple wireless base stations 1-1 and 1-2. In the following description, transmission with broadcasting may be simply referred to as broadcasting.

Each of the wireless base stations 1-1 and 1-2 may be realized as, for example, a personal computer, a server computer, or an incorporated system in an electronic device that has a wireless communication function. Each of the wireless terminals 2-1 to 2-M may be realized as, for example, a mobile information terminal such as a mobile phone, a smartphone or a PDA, a tablet computer, a personal computer, or an incorporated system in an electronic device that has a wireless communication function.

The wireless base stations 1-1 and 1-2 have ranges 3-1 and 3-2 in which wireless communication can be performed (i.e., communication areas), respectively. The wireless terminals 2-1 to 2-5 are positioned in the communication area 3-1 of the wireless base station 1-1. The wireless terminals 2-4 to 2-M are positioned in the communication area 3-2 of the wireless base station 1-2. Thus, the wireless terminals 2-4 and 2-5 are positioned in the multiple communication areas 3-1 and 3-2 of the wireless base stations 1-1 and 1-2.

When video is distributed simultaneously to the wireless terminals 2-1 to 2-M through the wireless base stations 1-1 and 1-2 in, for example, a location such as a stadium, some of the wireless terminals are probably positioned in the multiple communication areas 3-1 and 3-2 of the wireless base stations 1-1 and 1-2. In that case, the wireless terminals 2-4 and 2-5 may not correctly acquire distributed data because of a collision between data packets broadcasted by the wireless base stations 1-1 and 1-2 (that is, error on radio paths).

Specifically, for example, when the wireless terminals 2-4 and 2-5 cannot receive a key usable for data transfer in a first period, the wireless terminals 2-4 and 2-5 cannot decode data transferred in the first period. As an example of methods of dealing with this matter, there is a method in which the wireless base stations 1-1 and 1-2 transmit the key, which is usable for data transfer in the first period, in not only the first period but also the following second period. In that case, the wireless terminals 2-4 and 2-5 buffer data in the first period and decode the buffered data upon reception of the key in the second period.

However, in this method, each of the wireless terminals 2-4 and 2-5 must have a component to buffer all data portions received in the first period. Furthermore, if both of the keys transmitted in the first and second periods cannot be received continuously, the wireless terminals 2-4 and 2-5 cannot decode the buffered data, and the data will be discarded.

Thus, the wireless base stations 1-1 and 1-2 and the wireless terminals 2-1 to 2-M according to the present embodiment have a function to increase a possibility of transferring data correctly in a case where a collision between packets occurs. Specifically, each of the wireless base stations 1-1 and 1-2 broadcasts a key, which is usable for data transfer in a second period, in not only the second period but also a first period preceding the second period. When each of the wireless terminals 2-1 to 2-M receives the key in at least one of the first period and the second period, data transferred in the second period can be correctly acquired. Thus, a possibility that data can be transferred correctly from the wireless base stations 1-1 and 1-2 to the wireless terminals 2-1 to 2-M can be increased.

Figure 2:
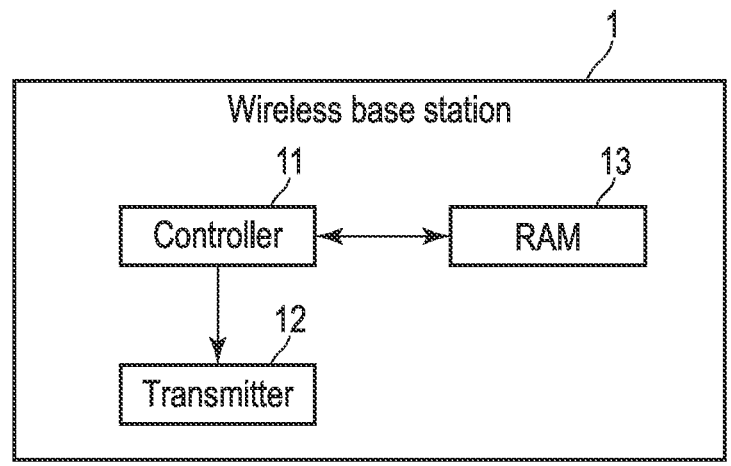
FIG. 2 is a block diagram illustrating a configuration example of a transmitter wireless communication apparatus (wireless base station) of the embodiment.

FIG. 2 illustrates a configuration example of a wireless base station 1. The aforementioned wireless base stations 1-1 and 1-2 each have the same configuration as the wireless base station 1.

The wireless base station 1 includes, for example, a controller 11, a transmitter 12, and a RAM 13. The controller 11 and the transmitter 12 may be realized as a hardware such as a circuit, or may be realized as software executed by one or more processors. Alternatively, some functions of the controller 11 and the transmitter 12 may be realized as a dedicated circuit, and the other functions may be realized as software executed by one or more processors.

The controller 11 controls each component of the wireless base station 1 to broadcast a communication frame. Specifically, the controller 11 generates a one-way key chain used in a sequence S corresponding to a certain period. The controller 11 stores the generated one-way key chain to, for example, the RAM 13.

The one-way key chain is a series of keys generated using a one-way hash function. The one-way hash function is a function having characteristics by which an output value is easily derived from an input value while the input value is difficult to derive from the output value. Furthermore, each of the generated keys is a hash function. The one-way key chain will be described later in detail with reference to FIG. 4.

The controller 11 uses the generated one key chain to generate a head information frame, a data frame, and an additional information frame that are transmitted with broadcasting in the sequence S.

The head information frame is a frame to be transmitted first amongst frames transmitted in the sequence S. The head information frame includes various information pieces related to the sequence S, a key of the one-way key chain used in the sequence S, and at least one key (for example, two keys) of a one-way key chain used in an immediately preceding sequence S−1. The head information flame further includes verification information that enables verification of authenticity of the head information frame. Upon reception of the head information frame, each of the wireless terminals 2-1 to 2-M can verify the authenticity using the verification information. The head information frame is, for example, an enhanced broadcast (eBCS) Info frame proposed for standardization of IEEE 802.11bc.

The data frame includes a data portion to be distributed with broadcasting and a key of the one-way key chain used in the sequence S. The data portion includes, for example, video data of sports, concert, and the like to be distributed in real time. In the sequence S, the data frame is transmitted after the head information frame. Furthermore, upon reception of a particular frame transmitted after the data frame, each of the wireless terminals 2-1 to 2-M can verify the authenticity of the data frame. The data frame is, for example, an eBCS Data frame proposed for standardization of IEEE 802.11bc.

The additional information frame includes various information pieces related to a next sequence S+1, a key of a one-way key chain used in the sequence S+1, and at least one key (for example, two keys) of the one-way key chain used in the current sequence S. In the sequence S, the additional information frame is transmitted after the head information frame. Upon reception of the additional information frame, each of the wireless terminals 2-1 to 2-M can verify the authenticity of the additional information frame.

The controller 11 requests the transmitter 12 to transmit each frame generated.

In response to the request by the controller 11, the transmitter 12 transmits each frame with broadcasting. Specifically, the transmitter 12 transmits a head information frame at specific time intervals. The specific time intervals may be referred to as transmission interval of head information frame $T_I$. A period between starting transmission of a head information frame and passing of the transmission interval $T_I$ corresponds to a sequence.

In a period corresponding to a sequence S, the transmitter 12 may transmit a data frame and an additional information frame with broadcasting after transmitting a head information frame.

Figure 3:
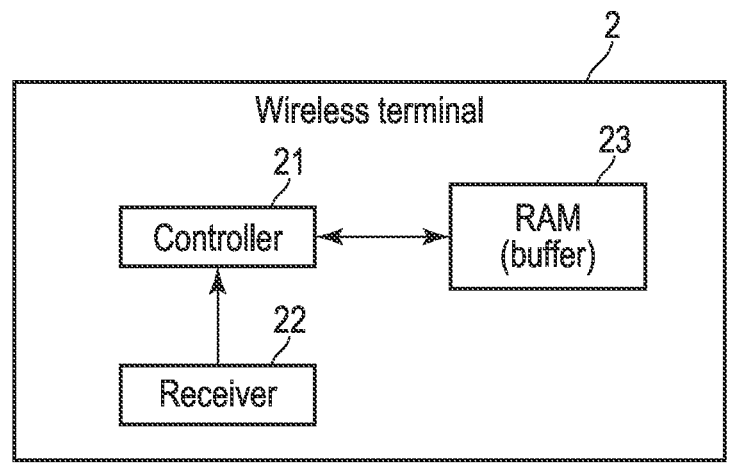
FIG. 3 is a block diagram illustrating a configuration example of a receiver wireless communication apparatus (wireless terminal) of the embodiment.

FIG. 3 illustrates a configuration example of a wireless terminal 2. The aforementioned wireless terminals 2-1, 2-2, 2-3, 2-4, 2-5, 2-6, . . . , and 2-M each have the same configuration as the wireless terminal 2.

The wireless base station 2 includes, for example, a controller 21, a receiver 22 and a RAM 23. The controller 21 and the receiver 22 may be realized as a hardware such as a circuit, or may be realized as software executed by one or more processors. Alternatively, some functions of the controller 21 and the receiver 22 may be realized as a dedicated circuit and the other functions may be realized as software executed by one or more processors.

The receiver 22 receives a communication frame that is transmitted with broadcasting by the wireless base station 1. The receiver 22 sends the received communication frame to the controller 21. The communication frame is a head information frame, a data frame, or an additional information frame. The receiver 22 may receive a head information frame first in a period corresponding to a sequence S. Then, during the period, the receiver 22 may receive a data frame and an additional information frame after receiving the head information frame.

The controller 21 processes the head information frame, the data frame, and the additional information frame, which are received, in order to acquire a data portion distributed with broadcasting from the wireless base station 1.

FIG. 4 illustrates an example of a one-way key chain used in the wireless base station 1 and the wireless terminal 2. As described above, the one-way key chain is a series of keys generated using a one-way hash function f1. Note that the one-way hash function f1 is known to both the wireless base station 1 and the wireless terminal 2. In the following description, the one-way hash function f1 may be simply referred to as function f1.

The controller 11 of the wireless base station 1 generates a one-way key chain for each sequence. FIG. 4 illustrates an example where a one-way key chain composed of six keys is generated for a sequence S.

Specifically, the controller 11 applies the function f1 to a random initial value (random seed), thereby generating a key $K_{S, 0}$. The controller 11 applies the function f1 to the key $K_{S, 0}$, thereby generating a key $K_{S, 1}$. The controller 11 applies the function f1 to the key $K_{S, 1}$, thereby generating a key $K_{S, 2}$. The controller 11 applies the function f1 to the key $K_{S, 2}$, thereby generating a key $K_{S, 3}$. The controller 11 applies the function f1 to the key $K_{S, 3}$, thereby generating a key $K_{S, 4}$. The controller 11 applies the function f1 to the key $K_{S, 4}$, thereby generating a key $K_{S, 5}$.

As above, the controller 11 generates the initial key $K_{S, 0}$ by applying the function f1 to the random initial value and then repeats an operation of applying the function f1 to the generated key, thereby generating the six keys in order. Note that a suffix S of a key $K_{S, X}$ indicates that the key $K_{S, X}$ is a key usable in a sequence S. Furthermore, a suffix X of the key $K_{S, X}$ indicates a number of the key $K_{S, X}$ in generation order of keys of a one-way key chain to which the key $K_{S, X}$ belongs, and may be referred to as key index.

The transmitter 12 of the wireless base station 1 is configured to transmit each key of the one-way key chain to the wireless terminal 2 in the reversed order of the generation order.

The configuration of each frame will be explained with reference to FIGS. 5 to 7. In this example, each frame is a frame transmitted in a sequence S.

FIG. 5 illustrates a configuration example of a head information frame. The head Information frame includes a key a key $K_{S, N-1}$, a key $K_{S-1, 1}$, a time stamp, a transmission interval of head information frame $T_I$, a key change interval $T_K$, a key delay interval d, a sequence number S, a public key of the wireless base station 1 with a certification by a certified authority (CA), and a digital signature by a private key of the wireless base station 1.

The key $K_{S, N-1}$ is a key generated last in a one-way key chain used in the sequence S. The key $K_{S-1, 0}$ is a key generated first in a one-way key chain used in an immediately preceding sequence S−1. The key $K_{S-1, 1}$ is a key generated second in the one-way key chain used in the immediately preceding sequence S−1.

The time stamp indicates a time as a reference of the sequence S (for example, start time).

The transmit interval of head information frame $T_I$ indicates a time interval between broadcastings of a head information frame per sequence. That is, when the transmit interval $T_I$ has passed since a head information frame of the sequence S was transmitted, the wireless base station 1 transmits a head information frame of the subsequent sequence S+1.

The key change interval $T_K$ indicates a time interval between changes of a key that is used in generation of an authentication code. That is, when the change interval $T_K$ has passed since using a key in the one-way key chain was started, the wireless base station 1 starts using another key. The authentication code is information to verify the authenticity of a data frame or an additional information frame that includes the authentication code.

The key delay interval d indicates an interval between a period where a key of the one-way key chain is used and a period where the key is transmitted. The periods each correspond to the key change interval $T_K$. The key is transmitted (that is, disclosed) to the wireless terminal 2 in a period delayed from the period where the key is used by the delay interval d. In the present embodiment, an example where the delay interval d is two will be mainly explained.

The sequence S is a number to identify the sequence including the head information frame. The wireless base station 1 sequentially assigns continuous numbers to continuous sequences, respectively.

The public key of the wireless base station 1 with the certification by CA includes a public key of the wireless base station 1 and a certification for the public key. The certification is generated using a private key of CA. The authenticity of the certification can be verified using the public key of CA.

The signature by the private key of the wireless base station 1 is a digital signature generated using the private key of the wireless base station 1. The authenticity of the digital signature can be verified using the public key of the wireless base station 1.

The wireless base station 1 broadcasts a head information frame, which has the configuration described above, first in the sequence S. The wireless base station 1 can transmit, to the wireless terminal 2, the keys $K_{S-1,\,0}$ and $K_{S-1,\,1}$ of the previous sequence S−1 and the key $K_{S,\,N-1}$ of the current sequence S along with various information pieces related to the sequence S while guaranteeing the authenticity of the head information frame by using the public key with the certification and the digital signature.

FIG. 6 illustrates a configuration example of a data frame. The data frame includes a key $K_{S,\,i+2}$, an authentication code $A_{S,\,i}$, a key index i corresponding to the authentication code $A_{S,\,i}$, a sequence number S, and a data portion.

The key $K_{S,\,i+2}$ is a key transmitted in the data frame.

The authentication code $A_{S,\,i}$ is information to verify the authenticity of the data frame. The authentication code $A_{S,\,i}$ is generated using a key $K_{S,\,i}$. Thus, the authentication code $A_{S,\,i}$ does not correspond to the key $K_{S,\,i+2}$ transmitted in the data frame. The key $K_{S,\,i+2}$ is located posterior to the key $K_{S,\,i}$, which corresponds to the authentication code $A_{S,\,i}$, in the generation order by the delay interval d (=2).

The key index i corresponding to the authentication code $A_{S,\,i}$ indicates an index (number) to specify the key $K_{S,\,i}$ corresponding to the authentication code $A_{S,\,i}$.

The sequence number S is a number to identify the sequence including the data frame.

The data portion is data to be transferred to the wireless terminal 2 in the data frame. The data portion includes, for example, video data of sports, concert, and the like to be distributed in real time.

In the sequence S, the wireless base station 1 broadcasts a data frame, which has the configuration described above, after broadcasting a head information frame. The wireless base station 1 can transmit a data portion to the wireless terminal 2 while guaranteeing the authenticity of the data frame with the authentication code $A_{S,\,i}$.

FIG. 7 illustrates a configuration example of an additional information frame. The additional information frame includes a key $K_{S,\,i+2}$, an authentication code $A_{S,\,i}$, a key index i corresponding to the authentication code $A_{S,\,i}$, a time stamp, a transmission interval of head information frame $T_I$, a key change interval $T_K$, a key delay interval d, a sequence number S+1, a public key of the wireless base station 1 with a certification by CA, a digital signature by a private key of the wireless base station 1, a key $K_{S+1,\,N-1}$, a key $K_{S,\,0}$ and a key $K_{S,\,1}$.

The key $K_{S,\,i+2}$, the authentication code $A_{S,\,i}$, and the key index i corresponding to the authentication code $A_{S,\,i}$ are described as above in relation to the data frame of FIG. 6. Furthermore, the time stamp, the transmission interval of head information frame $T_I$, the key change interval $T_K$, the key delay interval d, the public key of the wireless base station 1 with a certification by CA, and the digital signature by the private key of the wireless base station 1 are described as above in relation to the head information frame of FIG. 5. Note that the time stamp set here is a time as a reference of a sequence S+1 (for example, start time).

The key $K_{S+1,\,N-1}$ is a key generated last in a one-way key chain used in the following sequence S+1. The key $K_{S,\,0}$ is a key generated first in a one-way key chain used in the current sequence S. The key $K_{S,\,1}$ is a key generated second in the one-way key chain used in the current sequence S.

The sequence number S+1 indicates not the number of the current sequence S but the number of the following sequence S+1. This is because the additional information frame includes the three keys $K_{S,\,0}$, $K_{S,\,1}$ and $K_{S+1,\,N-1}$ transmitted in a head information frame of the following sequence S+1.

In the sequence S, the wireless base station 1 broadcasts an additional information frame, which has the configuration described above, after broadcasting a head information frame. The wireless base station 1 transmits, to the wireless terminal 2, the key $K_{S,\,0}$ and $K_{S,\,1}$ of the current sequence S and the key $K_{S+1,\,N-1}$ of the following sequence S+1 along with various information pieces related to the sequence S+1 while guaranteeing the authenticity of the additional information frame with the public key with a certification and the digital signature. Note that the authenticity of the additional information frame may be guaranteed with the authentication code $A_{S,\,i}$.

An example of the operation of each component of the wireless base station 1 and the wireless terminal 2 will be specifically explained with reference to FIGS. 2 and 3 again.

(Wireless Base Station)

Firstly, the controller 11 of the wireless base station 1 generates a first one-way key chain used in a first period corresponding to a sequence S. The controller 11 generates a first head information frame including a first verification information and a first key usable in the first period. Then, the transmitter 12 broadcasts the first head information frame first in the first period. The first verification information is information to verify the authentication of the first head information frame. The first key is a key generated final in the first one-way key chain. The first head information frame may further include first period information related to the first period. The first period information includes, for example, a number indicative of the sequence S.

Then, the controller 11 generates a second one-way key chain used in a second period following the first period (that is, period corresponding to the following sequence S+1). The controller 11 generates a data frame including first data, and an additional information frame including a fourth key usable in the second period. The fourth key is a key generated final in the second one-way key chain. The data frame may further include a second key from which the first key is capable of being derived. The additional information frame may further include a third key from which the first key is capable of being derived and verification information to verify the authenticity of the additional information frame (hereinafter referred to as second verification information).

Then, in the first period, the transmitter 12 broadcasts the generated data frame and broadcasts the additional information frame. The transmitter 12 transmits the additional information frame after transmitting the data frame, for example. In that case, the second key is a key generated second from the last in the first one-way key chain, for example. The third key is a key generated third from the last in the first one-way key chain, for example. That is, the first key and the second key can be derived from the third key. Note that the second key may be identical to the third key.

Alternatively, the transmitter 12 may transmit the data frame after transmitting the additional information frame. In that case, the second key is, for example, a key generated third from the last in the first one-way key chain. The third key is, for example, a key generated second from the last in the first one-way key chain. That is, the first key and the third key can be derived from the second key. Note that the second key may be identical to the third key.

Then, the controller 11 generates a second head information frame including third verification information and the fourth key. The third verification information is information to verify the authenticity of the second head information frame. Then, the transmitter 12 broadcasts the second head information frame first in the second period. The second head information frame may further include second period information related to the second period. The second period information includes a number indicative of the sequence S+1, for example.

Note that the aforementioned additional information frame may include the second period information. Alternatively, the additional information frame may be configured to include neither the first period information nor the second period information.

With the above configuration, the wireless base station 1 can broadcast the fourth key usable in the second period in not only the second head information frame in the second period but also the additional information frame in the first period. Thus, even if failing in reception of the second head information frame, the wireless terminal 2 can correctly acquire a data portion distributed in a data frame in the second period as long as the wireless terminal 2 receives the additional information frame.

Note that the controller 11 may generate first authentication information (for example, an authentication code) using a sixth key from which the first and second keys can be derived. The sixth key is a key generated prior to the first and second keys in the first one-way key chain. The first authentication information is included in the aforementioned data frame. The first authentication information may be used to verify the authenticity of the data frame (specifically, a data portion in the data frame).

Furthermore, the controller 11 may generate second authentication information using a seventh key from which the first and third keys can be derived. The seventh key is a key generated prior to the first and third keys in the first one-way key chain. The first authentication information is included in the aforementioned additional information frame. The second authentication information may be used to verify the authenticity of the additional information frame (specifically, an information portion in the additional information frame).

(Wireless Terminal)

Firstly, the receiver 22 of the wireless terminal 2 receives, in a first period corresponding to a sequence S, a first head information frame including first verification information and a first key usable in the first period. The first verification information is information to verify the authenticity of the first head information frame. The first key is a key generated final in the first one-way key chain. The first head information frame may further include first period information related to the first period. The first period information includes, for example, a number indicative of the sequence S.

The controller 21 verifies, upon reception of the first head information frame, the authenticity (i.e., correctness) of the first key in the first information frame using the first verification information. The controller 21 can use the first key authenticity of which is confirmed in a process (for example, decoding) of a data frame and an additional information frame received in the first period.

The receiver 22 receives, in the first period and after receiving the first head information frame, a first data frame including first data and receives an additional information frame including a fourth key usable in a second period following the first period. The fourth key is a key generated final in the second one-way key chain. The first data frame may further include a second key. The additional information may further include a third key and second verification information to verify the authenticity of the additional information frame.

The receiver 22 receives the additional information frame after receiving the first data frame, for example. In that case, the second key is, for example, a key generated second from the last in the first one-way key chain. The third key is, for example, a key generated third from the last in the first one-way key chain. That is, the first and second keys can be derived from the third key. Note that the second key may be identical to the third key.

Alternatively, the receiver 22 may receive the first data frame after receiving the additional information frame. In that case, the second key is, for example, a key generated third from the last in the first one-way key chain the third key is, for example, a key generated second from the last in the first one-way key chain. That is, the first key and the third key can be derived from the second key. Note that the second key may be identical to the third key.

In a case where the receiver 22 receives the additional information flame after receiving the first data frame, for example, the first data frame may further include first authentication information (for example, authentication code) generated using a seventh key from which the first, second and third keys can be derived. The first authentication information is information to verify the authenticity of the first data frame (specifically, data portion in the first data frame). The seventh key is a key generated prior to the first to third keys in the first one-way key chain. Furthermore, the additional information frame may further include the seventh key.

The controller 21 verifies the authenticity of the second key in the first data frame by using the first key authenticity of which is confirmed. If the first data frame includes the first authentication information, the controller 21 stores the first data frame in a buffer (for example, the RAM 23) until acquiring the seventh key that corresponds to the first authentication information and authenticity of which is confirmed.

Furthermore, the controller 21 verifies the authenticity of the third key in the additional information frame by using the first key or the second key authenticity of which is confirmed. Furthermore, the controller 21 verifies the authenticity of the fourth key in the additional information frame by using the second verification information.

Furthermore, the controller 21 may verify the authenticity of the seventh key in the additional information frame by using the second verification information. If the authenticity of the seventh key is confirmed, the controller 21 generates second authentication information using the seventh key. Then, if the first authentication information in the first data frame matches the generated second authentication information, the controller 21 determines that the authenticity of the first data frame is confirmed, that is, the authenticity of the first data is confirmed.

Then, the receiver 22 receives, in the second period, a second head information frame including third verification information and the fourth key. The controller 21 verifies the authenticity of the fourth key in the second head information frame by using the third verification information. The second head information frame may further include second period Information related to the second period. The second period information includes, for example, a number indicative of the sequence S+1.

Note that the aforementioned additional information frame may include the second period information. Alternatively, the additional information frame may be configured to include neither the first period information nor the second period information.

Then, the receiver 22 receives, in the second period, a second data frame including a fifth key and second data. The fifth key is a key generated prior to the fourth key in the second one-way key chain.

If the authenticity of the fourth key in the second head information frame is confirmed, the controller 21 verifies the authenticity of the fifth key by using the fourth key in the second head information frame. If the authenticity of the fourth key in the second head information frame is not confirmed and the authenticity of the fourth key in the additional information frame is confirmed, the controller 21 verifies the authenticity of the fifth key by using the fourth key in the additional information frame. Alternatively, if the reception of the second head information frame is not successful and the authenticity of the fourth key in the additional information frame is confirmed, the controller 21 verifies the authenticity of the fifth key by using the fourth key in the additional information frame.

With the above configuration, the second wireless terminal 2 can receive the fourth key usable in the second period through not only the second head information frame in the second period but also the additional information frame in the first period. Thus, even if failing in reception of the second head information frame, the wireless terminal 2 can correctly acquire a data portion distributed in a data frame in the second period as long as the wireless terminal 2 receives the additional information frame.

Figure 8:
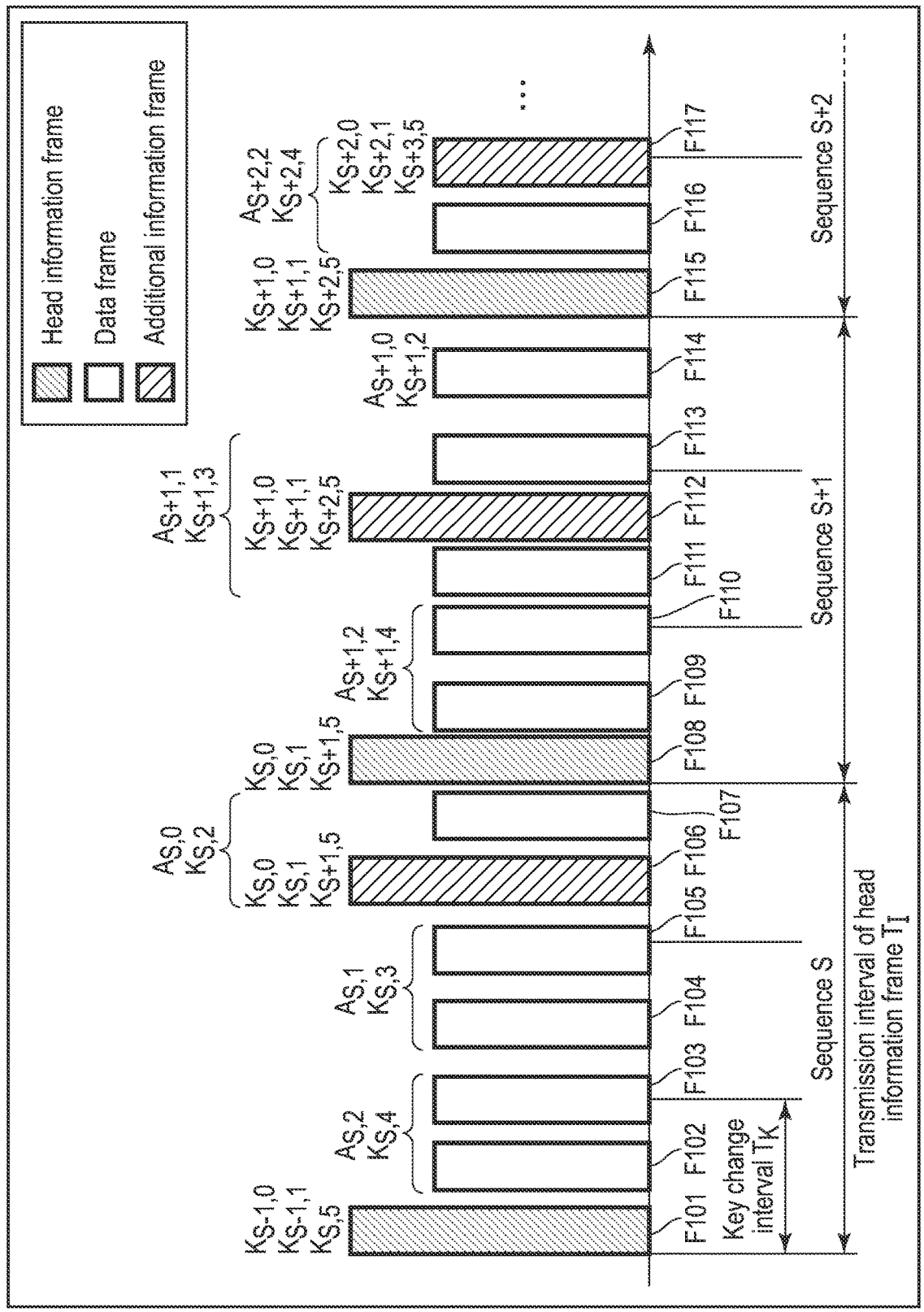
FIG. 8 is a diagram illustrating an example of frame sequences transferred between the wireless communication apparatuses of the embodiment.

FIG. 8 illustrates an example of frame sequences transferred from the wireless base station 1 to the wireless terminal 2.

The regulation of transmission of frame sequences by the wireless base station 1 is as follows.

The wireless base station 1 transmits a frame sequence for each predetermined period with broadcasting. The predetermined period corresponds to the transmission interval of head information frame $T_I$.

In each frame sequence, the wireless base station 1 transmits a head information frame first, and then may transmit a data frame and an additional information frame. The wireless base station 1 uses a key, which is changed for every key change interval $T_K$ from the time when a frame sequence is started, for generation of a data frame and an additional information frame. In the following description, a frame sequence may be simply referred to as sequence.

In the example of FIG. 8, a case where a one-way key chain composed of six keys is used for transfer of frames in each sequence is exemplified. That is, in a sequence S, six keys $K_{S,\ 0}$, $K_{S,\ 1}$, $K_{S,\ 2}$, $K_{S,\ 3}$, $K_{S,\ 4}$ and $K_{S,\ 5}$ are used. In a sequence S+1, six keys $K_{S+1,\ 0}$, $K_{S+1,\ 1}$, $K_{S+1,\ 2}$, $K_{S+1,\ 3}$, $K_{S+1,\ 4}$ and $K_{S+1,\ 5}$ are used. Similarly, in a sequence S+2, keys $K_{S+2,\ 0}$, $K_{S+2,\ 1}$, $K_{S+2,\ 2}$, $K_{S+2,\ 3}$, $K_{S+2,\ 4}$ and $K_{S+2,\ 5}$ are used.

As described above, each key constituting a one-way key chain of each sequence is transmitted from the wireless base station 1 to the wireless terminal 2 in the order opposite to the generation order. The order opposite to the generation order may be referred to as transmission order.

In each sequence, the wireless base station 1 transmits the first key in the transmission order of one key chain (for example, a key $K_{S,\ 5}$, $K_{S+1,\ 5}$, or $K_{S+2,\ 5}$), which is included in a head information frame. The wireless base station 1 may transmit each of the second and subsequent keys in the transmission order, which is included in a data frame or an additional information frame.

The wireless base station 1 may sequentially select one of the (2+d)-th and subsequent keys in the transmission order for every key change interval $T_K$ from the time when the sequence is started, and use the selected key for generation of a data frame and an additional information frame (specifically, generation of an authentication code). In the example of FIG. 8, the delay interval d is two. Note that the wireless base station 1 does not use keys prior to the (2+d)-th key in the transmission order (for example, the keys $K_{S,\ 5}$, $K_{S,\ 4}$ and $K_{S,\ 3}$ in the sequence S) for generation of a data frame and an additional information frame.

Furthermore, the wireless base station 1 transmits the keys number of which corresponds to the delay interval d from the last of the transmission order, which are included in both an additional information frame in the current sequence and a head information frame in the following sequence. For example, for the sequence S, the wireless base station 1 transmits the two keys from the last of the transmission order, that is, the keys $K_{S,\ 0}$ and $K_{S,\ 1}$, which are included in both the additional information frame in the sequence S and the head information frame in the following sequence S+1.

In the following description, an example of transfer of frames for each sequence will be explained in detail.

(Sequence S)

The wireless base station 1 transmits seven frames F101 to F107 in the sequence S. Specifically, the wireless base station 1 transmits a head information frame F101 first in the sequence S, and then transmits four data frames F102, F103, F104 and F105, an additional information frame F106, and a data frame F107 sequentially.

(Head Information Frame F101)

The head information frame F101 includes three keys $K_{S-1,\ 0}$, $K_{S-1,\ 1}$ and $K_{S,\ 5}$. The key $K_{S-1,\ 0}$ is a first key in the generation order in a one-way key chain used in the previous sequence S−1. The key $K_{S-1,\ 1}$ is a second key in the generation order in the one-way key chain used in the previous sequence S−1. The key $K_{S,\ 5}$ is a sixth key in the generation order (that is, a first key in the transmission order) in the one-way key chain used in the current sequence S. The authenticity of the head information frame F101 is confirmed with the public key of the wireless base station 1 with a certification by CA, and the digital signature by the private key of the wireless base station 1, which are further included in the head information frame F101.

When receiving the head information frame F101 from the desired wireless base station 1, the wireless terminal 2 can verify the authenticity of the head information frame F101. The wireless terminal 2 uses the public key of the wireless base station 1 with the certification by CA and the digital signature by the private key of the wireless base station 1 to verify the authenticity of the head information frame F101. If the authenticity of the head information frame F101 is confirmed, the wireless terminal 2 uses the three keys $K_{S-1,\ 0}$, $K_{S-1,\ 1}$ and $K_{S,\ 5}$ included in the head information frame F101 as authenticity-confirmed keys. If there is the authenticity-confirmed key $K_{S,\ 5}$, the wireless terminal 2 can verify the authenticity of a data frame received in the sequence S and the authenticity of an additional information frame received in the sequence S.

On the other hand, if the authenticity of the head information frame F101 is not confirmed, the wireless terminal 2 discards the head information frame F101 and does not use the three keys $K_{S-1, 0}$, $K_{S-1, 1}$ and $K_{S, 5}$. Note that, if there is not an authenticity-confirmed key $K_{S, 5}$, there is a possibility that the wireless terminal 2 cannot verify the authenticity of a data frame received in the sequence S and the authenticity of an additional information frame received in the sequence S, and discards these frames.

(Data Frames F102 and F103)

The wireless base station 1 generates an authentication code $A_{S, 2}$ using the key $K_{S, 2}$ in the first key change interval $T_K$ in the sequence S. Then, the wireless base station 1 transmits the data frame F102 and the data frame F103. Both the data frame F102 and the data frame F103 include the generated authentication code $A_{S, 2}$ and the key $K_{S, 4}$. The key $K_{S, 4}$ is a fifth key in the generation order (that is, a second key in the transmission order) in the one-way key chain used in the sequence S.

Specifically, the wireless base station 1 generates an authentication code $A_{S, 2}$ using a hash function f2 and the key $K_{S, 2}$. The hash function f2 is different from the function f1 used in the generation of the one-way key chain. The wireless base station 1 uses, for example, a hash value, which is calculated by applying the hash function f2 to the key $K_{S, 2}$, as the authentication code $A_{S, 2}$. The hash function f2 is known in both the wireless base station 1 and the wireless terminal 2. In the following description, the hash function f2 will be simply referred to as function f2.

The wireless terminal 2 verifies, upon reception of each of the data frames F102 and F103, the authenticity (i.e., correctness) of the key $K_{S, 4}$ in each of the data frames F102 and F103. The wireless terminal 2 can verify the authenticity of the key $K_{S, 4}$ in each of the data frames F102 and F103 by using the key $K_{S, 5}$ authenticity of which was already confirmed (i.e., authenticity-confirmed key $K_{S, 5}$).

Specifically, if the data frame F102 has been received, for example, the wireless terminal 2 applies the function f1 to the key $K_{S, 4}$ in the data frame F102, thereby calculating a hash function. Then, the wireless terminal 2 determines whether or not the calculated hash function matches the authenticity-confirmed key $K_{S, 5}$. If the calculated function matches the key $K_{S, 5}$, the wireless terminal 2 uses the key $K_{S, 4}$ as an authenticity-confirmed key. If the calculated function does not match the key $K_{S, 5}$, the wireless terminal 2 discards the data frame F102 and does not use the key $K_{S, 4}$.

Furthermore, the wireless terminal 2 verifies the authenticity of the data frame F102 by using the authentication code $A_{S, 2}$ in the data frame F102 and an authenticity-confirmed key $K_{S, 2}$ that corresponds to the authentication code $A_{S, 2}$. At the time of receiving the data frame F102, the wireless terminal 2 cannot verify the authenticity of the data frame F102 since the wireless terminal 2 does not receive a frame including the key $K_{S, 2}$ from the wireless base station 1. Thus, the wireless terminal 2 buffers the data frame F102 to the RAM 23.

The wireless terminal 2 processes the data frame F103 as with the data frame F102.

(Data Frames F104 and F105)

The wireless base station 1 generates an authentication code $A_{S, 1}$ using the key $K_{S, 1}$ in the second key change interval $T_K$ in the sequence S. Then, the wireless base station 1 transmits the data frame F104 and the data frame F105. Both the data frame F104 and the data frame F105 include the generated authentication code $A_{S, 1}$ and the key $K_{S, 3}$. The key $K_{S, 3}$ is a fourth key in the generation order (that is, a third key in the transmission order) in the one-way key chain used in the sequence S.

Specifically, the wireless base station 1 generates the authentication code $A_{S, 1}$ by using the hash function f2 and the key $K_{S, 1}$. The wireless base station 1 applies, for example, the function f2 to the key $K_{S, 1}$, thereby generating the authentication code $A_{S, 1}$.

The wireless terminal 2 verifies, upon reception of each of the data frames F104 and F105, the authenticity of the key $K_{S, 3}$ in each of the data frames F104 and F105. The wireless terminal 2 uses the key $K_{S, 4}$ (or the key $K_{S, 5}$) authenticity of which was already confirmed and which is located posterior to the key $K_{S, 3}$ in the generation order, in order to verify the authenticity of the key $K_{S, 3}$ in each of the data frames F104 and F105.

Specifically, if the data frame F104 has been received, for example, the wireless terminal 2 applies the function f1 to the key $K_{S, 3}$ in the data frame F104, thereby calculating a hash function. Then, the wireless terminal 2 determines whether or not the calculated hash function matches the authenticity-confirmed key $K_{S, 4}$. If the calculated hash function matches the key $K_{S, 4}$, the wireless terminal 2 uses the key $K_{S, 3}$ as an authenticity-confirmed key. If the calculated hash function does not match the key $K_{S, 4}$, the wireless terminal 2 discards the data frame F104 and does not use the key $K_{S, 3}$. Note that, the wireless terminal 2 may apply the function f1 twice to the key $K_{S, 3}$ in the data frame F104 to calculate a hash function, and compare the calculated function with the authenticity-confirmed key $K_{S, 5}$.

Furthermore, the wireless terminal 2 verifies the authenticity of the data frame F104 by using the authentication code $A_{S, 1}$ in the data frame F104 and an authenticity-confirmed key $K_{S, 1}$ that corresponds to the authentication code $A_{S, 1}$. At the time of receiving the data frame F104, the wireless terminal 2 cannot verify the authenticity of the data frame F104 since the wireless terminal 2 does not receive a frame including the key $K_{S, 1}$ from the wireless base station 1. Thus, the wireless terminal 2 buffers the data frame F104 to the RAM 23.

The wireless terminal 2 processes the data frame F105 as with the data frame F104.

(Additional Information Frame F106 and Data Frame F107)

The wireless base station 1 generates an authentication code $A_{S, 0}$ using the key $K_{S, 0}$ in the third key change interval $T_K$ in the sequence S. Then, the wireless base station 1 transmits the additional information frame F106 and the data frame F107. Both the additional information frame F106 and the data frame F107 include the generated authentication code $A_{S, 0}$ and the key $K_{S, 2}$. The key $K_{S, 2}$ is a third key in the generation order (that is, a fourth key in the transmission order) in the one-way key chain used in the sequence S.

Specifically, the wireless base station 1 generates the authentication code $A_{S, 1}$ using the hash function f2 and the key $K_{S, 1}$. The wireless base station 1 applies, for example, the function f2 to the key $K_{S, 0}$, thereby generating the authentication code $A_{S, 0}$.

The additional information frame F106 further includes the three keys $K_{S, 0}$, $K_{S, 1}$ and $K_{S+1, 5}$. The key $K_{S, 0}$ is a first key in the generation order (that is, a sixth key in the transmission order) in the one-way key chain used in the sequence S. The key $K_{S, 1}$ is a second key in the generation order (that is, a fifth key in the transmission order) in the one-way key chain used in the sequence S. The key $K_{S+1, 5}$ is a sixth key in the generation order (that is, a first key in the transmission order) in the one-way key chain used in the following sequence S+1.

If the additional information frame F106 has been received, the wireless terminal 2 can verify the authenticity of the additional information frame F106. The wireless terminal 2 uses the public key of the wireless base station 1 with a certification by CA and the digital signature by the private key of the wireless base station 1 in order to verify the authenticity of the additional information frame F106. If the authenticity of the additional information frame F106 is confirmed, the wireless terminal 2 uses the three keys $K_{S,0}$, $K_{S,1}$ and $K_{S+1,5}$ included in the additional information frame F106 as authenticity-confirmed keys. If there is the authenticity-confirmed key $K_{S+1,5}$, the wireless terminal 2 can verify the authenticity of an data frame received in the sequence S+1 and the authenticity of an additional information frame received in the sequence S+1.

On the other hand, if the authenticity of the additional information frame F106 is not confirmed, the wireless terminal 2 discards the additional information frame F106 and does not use the three keys $K_{S,0}$, $K_{S,1}$ and $K_{S+1,5}$.

If the authenticity-confirmed key $K_{S,1}$ is acquired, the wireless terminal 2 can verify the authenticity of each of the buffered data frames F104 and F105 including the corresponding authentication code $A_{S,1}$. Specifically, the wireless terminal 2 applies the hash function f2 to the key $K_{S,1}$, thereby calculating a hash value. Then, the wireless terminal 2 determines whether or not the calculated hash value matches the authentication code $A_{S,1}$ in the data frame F104. If the calculated hash value matches the authentication code $A_{S,1}$, the wireless terminal 2 determines that the authenticity of the data frame F104 is confirmed, and sends the data portion of the data frame F104 to an upper layer. That is, the wireless terminal 2 can acquire the correct data portion from the authenticity-confirmed data frame F104. The upper layer is, for example, an OS or various application programs. In the upper layer, a process using the data portion (for example, playback process of video based on video data) is performed.

On the other hand, if the calculated hash value does not match the authentication code $A_{S,1}$, the wireless terminal 2 determines that the authenticity of the data frame F104 is not confirmed, and discards the data frame F104. Thus, the data portion of the data frame F104 is not sent to the upper layer.

In a similar manner, the wireless terminal 2 can verify the authenticity of the data frame F105 and send the data portion of the authenticity-confirmed data frame F105 to the upper layer.

Furthermore, if the additional information frame F106 has been received, the wireless terminal 2 verifies the authenticity of the key $K_{S,2}$ in the additional information frame F106. The wireless terminal 2 uses the key $K_{S,3}$ (or key $K_{S,5}$ or key $K_{S,4}$) authenticity of which was already confirmed and which is located posterior to the key $K_{S,2}$ in the generation order, in order to verify the authenticity of the key $K_{S,2}$ in the additional information frame F106.

Specifically, the wireless terminal 2 applies the function f1 to the key $K_{S,2}$ in the additional information frame F106, thereby calculating a hash function. Then, the wireless terminal 2 determines whether or not the calculated hash function matches the authenticity-confirmed key $K_{S,3}$. If the calculated function matches the key $K_{S,3}$, the wireless terminal 2 uses the key $K_{S,2}$ as an authenticity-confirmed key. If the calculated function does not match the key $K_{S,3}$, the wireless terminal 2 does not use the key $K_{S,2}$. Note that the wireless terminal 2 may apply the function f1 twice to the key $K_{S,2}$ in the additional information frame F106 to calculate a hash function, and compare the calculated hash function with the authenticity-confirmed key $K_{S,4}$. Alternatively, the wireless terminal 2 may apply the function f1 three times to the key $K_{S,2}$ in the additional information frame F106 to calculate a hash function, and compare the calculated function with the authenticity-confirmed key $K_{S,5}$.

If the authenticity-confirmed key $K_{S,2}$ is acquired, the wireless terminal 2 can verify the authenticity of each of the buffered data frames F102 and F103 including the corresponding authentication code $A_{S,2}$. Specifically, the wireless terminal 2 applies the hash function f2 to the key $K_{S,2}$, thereby calculating a hash value. The wireless terminal 2 determines whether or not the calculated hash value matches the authentication code $A_{S,2}$ in the data frame F102. If the calculated hash value matches the authentication code $A_{S,2}$, the wireless terminal 2 determines that the authenticity of the data frame F102 is confirmed, and sends the data portion of the data frame F102 to the upper layer.

On the other hand, if the calculated hash value does not match the authentication code $A_{S,2}$, the wireless terminal 2 determines that the authenticity of the data frame F102 is not confirmed, and discards the data frame F102. Thus, the data portion of the data frame F102 is not sent to the upper layer.

In a similar manner, the wireless terminal 2 can verify the authenticity of the data frame F103 and send the data portion of the authenticity-confirmed data frame F103 to the upper layer.

Then, if the data frame F107 has been received, the wireless terminal 2 verifies the authenticity of the key $K_{S,2}$ in the data frame F107. The wireless terminal 2 uses the key $K_{S,3}$ (or key $K_{S,5}$ or key $K_{S,4}$) authenticity of which was already confirmed and that is located posterior to the key $K_{S,2}$ in the generation order, in order to verify the authenticity of the key $K_{S,2}$ in the data frame F107.

Specifically, the wireless terminal 2 applies the function f1 to the key $K_{S,2}$ in the data frame F107, thereby calculating a hash function. Then, the wireless terminal 2 determines whether or not the calculated hash function matches the authenticity-confirmed key $K_{S,3}$. If the calculated function matches the key $K_{S,3}$, the wireless terminal 2 uses the key $K_{S,2}$ as an authenticity-confirmed key. If the calculated function does not match the key $K_{S,3}$, the wireless terminal 2 discards the data frame F107 and does not use the key $K_{S,2}$. Note that, the wireless terminal 2 may apply the function f1 twice to the key $K_{S,2}$ in the data frame F107 to calculate a hash function, and compare the calculated hash function with the authenticity-confirmed key $K_{S,4}$. Alternatively, the wireless terminal 2 may apply the function f1 three times to the key $K_{S,2}$ in the data frame F107 to calculate a hash function, and compare the calculated function with the authenticity-confirmed key $K_{S,5}$.

Furthermore, the wireless terminal 2 verifies the authenticity of the data frame F107 by using the authentication code $A_{S,0}$ in the data frame F107 and the authenticity-confirmed key $K_{S,0}$ corresponding to the authentication code $A_{S,0}$. If the additional information frame F106 has been received and the authenticity-confirmed key $K_{S,0}$ has been acquired, the wireless terminal 2 verifies the authenticity of the data frame F107 using the key $K_{S,0}$ and the authentication code $A_{S,0}$ in the data frame F107.

Specifically, the wireless terminal 2 applies the hash function f2 to the key $K_{S,0}$, thereby calculating a hash value. The wireless terminal 2 determines whether or not the calculated hash value matches the authentication code $A_{S,0}$ in the data frame F107. If the calculated hash value matches the authentication code $A_{S, 0}$, the wireless terminal 2 determines that the authenticity of the data frame F107 is confirmed, and sends the data portion of the data frame F107 to the upper layer. If the calculated hash value does not match the authentication code $A_{S, 0}$, the wireless terminal 2 determines that the authenticity of the data frame F107 is not confirmed, and discards the data frame F107. Thus, the data portion of the data frame F107 is not sent to the upper layer.

As above, in the sequence S, the authenticity of each of the transferred data frames F102 to F105 and the authenticity of the transferred additional information frame F106 are guaranteed using the six keys $K_{S, 0}$, $K_{S, 1}$, $K_{S, 2}$, $K_{S, 3}$, $K_{S, 4}$ and $K_{S, 5}$ that constitute the one-way key chain. Furthermore, with the additional information frame F106, the three keys $K_{S, 0}$, $K_{S, 1}$ and $K_{S+1, 5}$, which are included in the head information frame F108 in the following sequence S+1, may be transferred.

(Sequence S+1)

The wireless base station 1 transmits seven frames F108 to F114 in the sequence S+1. Specifically, the wireless base station 1 transmits a head information frame F108 first in the sequence S+1, and then transmits three data frames F109, F110 and F111, an additional information frame F112, and two data frames F113 and F114 sequentially.

(Head Information Frame 108)

The head information frame F108 includes the three keys $K_{S, 0}$, $K_{S, 1}$ and $K_{S+1, 5}$. The key $K_{S, 0}$ is a first key in the generation order in the one-way key chain usable in the previous sequence S. The key $K_{S, 1}$ is a second key in the generation order in the one-way key chain usable in the previous sequence S. The key $K_{S+1, 5}$ is a sixth key in the generation order (that is, a first key in the transmission order) in the one-way key chain usable in the current sequence S+1. The authenticity of the head information frame F108 is guaranteed with the public key of the wireless base station 1 with a certification by CA and the digital signature by the private key of the wireless base station 1 that are further included in the head information frame F108.

If the head information frame F108 has been received, the wireless terminal 2 can verify the authenticity of the head information frame F108. The wireless terminal 2 uses the public key of the wireless base station 1 with a certification by CA and the digital signature by the private key of the wireless base station 1, in order to verify the authenticity of the head information frame F108. If the authenticity of the head information frame F108 is confirmed, the wireless terminal 2 uses the three keys $K_{S, 0}$, $K_{S, 1}$ and $K_{S+1, 5}$ included in the head information frame F108 as authenticity-confirmed keys. If there is the authenticity-confirmed key $K_{S+1, 5}$, the wireless terminal 2 can verify the authenticity of a data frame received in the sequence S+1 and the authenticity of an additional information frame received in the sequence S+1. The authenticity-confirmed key $K_{S+1, 5}$ may be acquired from not only the head information frame F108 but also the additional information frame of the previous sequence S.

On the other hand, if the authenticity of the head information frame F108 is not confirmed, the wireless terminal 2 discards the head information frame F108 and does not use the three keys $K_{S, 0}$, $K_{S, 1}$ and $K_{S+1, 5}$. If there is not an authenticity-confirmed key $K_{S+1, 5}$, there is a possibility that the wireless terminal 2 discards a data frame and an additional information frame that are received in the sequence S+1 without verifying the authenticity of the data frame and the authenticity of the additional information frame.

(Data Frames F109 and F110)

The wireless base station 1 generates an authentication code $A_{S+1, 2}$ using the key $K_{S+1, 2}$ in the first key change interval $T_K$ in the sequence S+1. Then, the wireless base station 1 transmits the data frame F109 and the data frame F110. Both the data frame F109 and the data frame F110 include the generated authentication code $A_{S+1, 2}$ and the key $K_{S+1, 4}$. The key $K_{S+1, 4}$ is a filth key in the generation order (that is, a second key in the transmission order) in the one-way key chain usable in the sequence S+1.

Specifically, the wireless base station 1 generates an authentication code $A_{S+1, 2}$ using the hash function f2 and the key $K_{S+1, 2}$. The wireless base station 1 uses, for example, a hash value, which is calculated by applying the hash function f2 to the key $K_{S+1, 2}$, as the authentication code $A_{S+1, 2}$.

If each of the data frames F109 and F110 has been received, the wireless terminal 2 verifies the authenticity of the key $K_{S+1, 4}$ in each of the data frames F109 and F110. The wireless terminal 2 can verify the authenticity of the key $K_{S+1, 4}$ in each of the data frames F109 and F110 by using the authenticity-confirmed key $K_{S+1, 5}$.

Specifically, if the data frame F109 has been received, for example, the wireless terminal 2 applies the function f1 to the key $K_{S+1, 4}$ in the data frame F109, thereby calculating a hash function. Then, the wireless terminal 2 determines whether or not the calculated hash function matches the authenticity-confirmed key $K_{S+1, 5}$. If the calculated function matches the key $K_{S+1, 5}$, the wireless terminal 2 uses the key $K_{S+1, 4}$ as an authenticity-confirmed key. If the calculated function does not match the key $K_{S+1, 5}$, the wireless terminal 2 discards the data frame F109 and does not use the key $K_{S+1, 4}$.

Furthermore, the wireless terminal 2 verifies the authenticity of the data frame F109 by using the authentication code $A_{S+1, 2}$ in the data frame F109 and the authenticity-confirmed key $K_{S+1, 2}$ corresponding to the authentication code $A_{S+1, 2}$. At the time of receiving the data frame F109, the wireless terminal 2 cannot verify the authenticity of the data frame F109 since the wireless terminal 2 does not receive a frame including the key $K_{S+1, 2}$ from the wireless base station 1. Thus, the wireless terminal 2 buffers the data frame F109 to the RAM 23.

The wireless terminal 2 processes the data frame F110 as with the data frame F109.

(Data Frame F111, Additional Information Frame F112 and Data Frame F113)

The wireless base station 1 generates an authentication code $A_{S+1, 1}$ using the key $K_{S+1, 1}$ in the second key change interval $T_K$ in the sequence $S_{S+1}$. Then, the wireless base station 1 transmits the data frame F111, the additional information frame F112 and the data frame F113. Each of the frames F111, F112 and F113 includes the generated authentication code $A_{S+1, 1}$ and the key $K_{S+1, 3}$. The key $K_{S+1, 3}$ is a fourth key in the generation order (that is, a third key in the transmission order) in the one way key chain usable in the sequence S+1.

Specifically, the wireless base station 1 generates the authentication code $A_{S+1, 1}$ using the hash function f2 and the key $K_{S+1, 1}$. The wireless base station 1 applies, for example, the function f2 to the key $K_{S+1, 1}$, thereby generating the authentication code $A_{S+1, 1}$.

The additional information frame F112 further includes the three keys $K_{S+1, 0}$, $K_{S+1, 1}$ and $K_{S+2, 5}$. The key $K_{S+1, 0}$ is a first key in the generation order (that is, a sixth key in the transmission order) in the one-way key chain usable in the sequence S+1. The key $K_{S+1, 1}$ is a second key in the generation order (that is, a fifth key in the transmission order) in the one-way key chain usable in the sequence S+1.

The key $K_{S+2, 5}$ is a sixth key in the generation order (that is, a first key in the transmission order) in the one-way key chain usable in the following sequence S+2.

If the data frame F111 has been received, the wireless terminal 2 verifies the authenticity of the key $K_{S+1, 3}$ in the data frame F111. The wireless terminal 2 uses the authenticity-confirmed key $K_{S+1, 4}$ (or key $K_{S+1, 5}$) that is located posterior to the key $K_{S+1, 3}$ in the generation order, in order to verify the authenticity of the key $K_{S+1, 3}$ in the data frame F111.

Specifically, if the data frame F111 has been received, the wireless terminal 2 applies the function f1 to the key $K_{S+1, 3}$ in the data frame F111, thereby calculating a hash function. Then, the wireless terminal 2 determines whether or not the calculated hash function matches the authenticity-confirmed key $K_{S+1, 4}$. If the calculated function matches the key $K_{S+1, 4}$, the wireless terminal 2 uses the key $K_{S+1, 3}$ as an authenticity-confirmed key. If the calculated function does not match the key $K_{S+1, 4}$, the wireless terminal 2 discards the data frame F111 and does not use the key $K_{S+1, 3}$. Note that, the wireless terminal 2 may apply the function f1 twice to the key $K_{S+1, 3}$ in the data frame F111 to calculate a hash function, and compare the calculated function with the authenticity-confirmed key $K_{S+1, 5}$.

Furthermore, the wireless terminal 2 verifies the authenticity of the data frame F111 by using the authentication code $A_{S+1, 1}$ in the data frame F111 and the authenticity-confirmed key $K_{S+1, 1}$ that corresponds to the authentication code $A_{S+1, 1}$. At the time of receiving the data frame F111, the wireless terminal 2 cannot verify the authenticity of the data frame F111 since the wireless terminal 2 does not receive a frame including the key $K_{S+1, 1}$ from the wireless base station 1. Thus, the wireless terminal 2 buffers the data frame F111 to the RAM 23.

Then, the wireless terminal 2 receives the additional information frame F112 and verifies the authenticity of the additional information frame F112. The wireless terminal 2 uses the public key of the wireless base station 1 with a certification by CA and the digital signature by the private key of the wireless base station 1 that are included in the additional information frame F112 in order to verify the authenticity of the additional information frame F112. If the authenticity of the additional information frame F112 is confirmed, the wireless terminal 2 uses the three keys $K_{S+1, 0}$, $K_{S+1, 1}$ and $K_{S+2, 5}$ included in the additional information frame F112 as authenticity-confirmed keys. If there is the authenticity-confirmed key $K_{S+2, 5}$, the wireless terminal 2 can verify the authenticity of a data frame received in the sequence S+2 and the authenticity of an additional information frame received in the sequence S+2.

On the other hand, if the authenticity of the additional information frame F112 is not confirmed, the wireless terminal 2 discards the additional information frame F112, and does not use the three keys $K_{S+1, 0}$, $K_{S+1, 1}$ and $K_{S+2, 5}$.

If the authenticity-confirmed key $K_{S+1, 1}$ is acquired, the wireless terminal 2 can verify the authenticity of the buffered data frame F111 that includes the corresponding authentication code $A_{S+1, 1}$. Specifically, the wireless terminal 2 applies the hash function f2 to the key $K_{S+1, 1}$, thereby calculating a hash value. The wireless terminal 2 determines whether or not the calculated hash value matches the authentication code $A_{S+1, 1}$ in the data frame F111. If the calculated hash value matches the authentication code $A_{S+1, 1}$, the wireless terminal 2 determines that the authenticity of the data frame F111 is confirmed, and sends the data portion of the data frame F111 to the upper layer.

On the other hand, if the calculated hash value does not match the authentication code $A_{S+1, 1}$, the wireless terminal 2 determines that the authenticity of the data frame F111 is not confirmed, and discards the data frame F111. Thus, the data portion of the data frame F111 is not sent to the upper layer.

Furthermore, if the additional information frame F112 has been received, the wireless terminal 2 verifies the authenticity of the key $K_{S+1, 3}$ in the additional information frame F112. The wireless terminal 2 uses the authenticity-confirmed key $K_{S+1, 4}$ (or key $K_{S+1, 5}$) that is located posterior to the key $K_{S+1, 3}$ in the generation order, in order to verify the authenticity of the key $K_{S+1, 3}$ in the additional information frame F112.

Specifically, the wireless terminal 2 applies the function f1 to the key $K_{S+1, 3}$ in the additional information frame F112, thereby calculating a hash function. Then, the wireless terminal 2 determines whether or not the calculated hash function matches the authenticity-confirmed key $K_{S+1, 4}$. If the calculated function matches the key $K_{S+1, 4}$, the wireless terminal 2 uses the key $K_{S+1, 3}$ as an authenticity-confirmed key. If the calculated function does not match the key $K_{S+1, 4}$, the wireless terminal 2 does not use the key $K_{S+1, 3}$. Note that, the wireless terminal 2 may apply the function f1 twice to the key $K_{S+1, 3}$ in the additional information frame F112 to calculate a hash function, and compare the calculated hash function with the authenticity-confirmed key $K_{S+1, 5}$.

Then, if the data information frame F113 has been received, the wireless terminal 2 verifies the authenticity of the key $K_{S+1, 3}$ in the data frame F113. The wireless terminal 2 uses the authenticity-confirmed key $K_{S+1, 4}$ (or key $K_{S+1, 5}$) that is located posterior to the key $K_{S+1, 3}$ in the generation order, in order to verify the authenticity of the key $K_{S+1, 3}$ in the data frame F113.

Specifically, the wireless terminal 2 applies the function f1 to the key $K_{S+1, 3}$ in the data frame F113, thereby calculating a hash function. Then, the wireless terminal 2 determines whether or not the calculated hash function matches the authenticity-confirmed key $K_{S+1, 4}$. If the calculated function matches the key $K_{S+1, 4}$, the wireless terminal 2 uses the key $K_{S+1, 3}$ as an authenticity-confirmed key. If the calculated function does not match the key $K_{S+1, 4}$, the wireless terminal 2 discards the data frame F113 and does not use the key $K_{S+1, 3}$. Note that, the wireless terminal 2 may apply the function f1 twice to the key $K_{S+1, 3}$ in the data frame F113 to calculate a hash function, and compare the calculated hash function with the authenticity-confirmed key $K_{S+1, 5}$.

Furthermore, the wireless terminal 2 verifies the authenticity of the data frame F113 by using the authentication code $A_{S+1, 1}$ in the data frame F113 and the authenticity-confirmed key $K_{S+1, 1}$ that corresponds to the authentication code $A_{S+1, 1}$. If the additional information frame F112 has been received and the authenticity-confirmed key $K_{S+1, 1}$ has been acquired, the wireless terminal 2 verifies the authenticity of the data frame F113 using the key $K_{S+1, 1}$ and the authentication code $A_{S+1, 1}$ that is included in the data frame F113.

Specifically, the wireless terminal 2 applies the hash function f2 to the key $K_{S+1, 1}$, thereby calculating a hash value. The wireless terminal 2 determines whether or not the calculated hash value matches the authentication code $A_{S+1, 1}$ in the data frame F113. If the calculated hash value matches the authentication code $A_{S+1, 1}$, the wireless terminal 2 determines that the authenticity of the data frame F113 is confirmed, and sends the data portion of the data frame F113 to the upper layer. If the calculated hash value does not match the authentication code $A_{S+1, 1}$, the wireless terminal 2 determines that the authenticity of the data frame F113 is not confirmed and discards the data frame F113. Thus, the data portion of the data frame F11 is not sent to the upper layer.

(Data Frame F114)

The wireless base station 1 generates an authentication code $A_{S+1, 0}$ using the key $K_{S+1, 0}$ in the third key change interval $T_K$ in the sequence S+1. Then, the wireless base station 1 transmits the data frame F114 including the generated authentication code $A_{S+1, 0}$ and the key $K_{S+1, 2}$. The key $K_{S+1, 2}$ is a third key in the generation order (that is, a fourth key in the transmission order) in the one-way key chain usable in the sequence S+1.

Specifically, the wireless base station 1 generates the authentication code $A_{S+1, 0}$ using the hash function f2 and the key $K_{S+1, 0}$. The wireless base station 1 applies, for example, the function f2 to the key $K_{S+1, 0}$, thereby generating the authentication code $A_{S+1, 0}$.

If the data frame F114 has been received, the wireless terminal 2 verifies the authenticity of the key $K_{S+1, 2}$ in the data frame F114. The wireless terminal 2 use the authenticity-confirmed key $K_{S+1, 3}$ (or key $K_{S+1, 5}$ or key $K_{S+1, 4}$) that is located posterior to the key $K_{S+1, 2}$ in the generation order, in order to verify the authenticity of the key $K_{S+1, 2}$ in the data frame F114.

Specifically, the wireless terminal 2 applies the function f1 to the key $K_{S+1, 2}$ in the data frame F114, thereby calculating a hash function. Then, the wireless terminal 2 determines whether or not the calculated hash function matches the authenticity-confirmed key $K_{S+1, 3}$. If the calculated function matches the key $K_{S+1, 3}$, the wireless terminal 2 uses the key $K_{S+1, 2}$ as an authenticity-confirmed key. If the calculated function does not match the key $K_{S+1, 3}$, the wireless terminal 2 discards the data frame F114 and does not use the key $K_{S+1, 2}$. Note that, the wireless terminal 2 may apply the function f1 twice to the key $K_{S+1, 2}$ in the data frame F114 to calculate a hash function, and compare the calculated hash function with the authenticity-confirmed key $K_{S+1, 4}$. Alternatively, the wireless terminal 2 may apply the function f1 three times to the key $K_{S+1, 2}$ in the data frame F114 to calculate a hash function, and compare the calculated hash function with the authenticity-confirmed key $K_{S+1, 5}$.

If the authenticity-confirmed key $K_{S+1, 2}$ has been acquired, the wireless terminal 2 can verify the authenticity of each of the buffered data frames F109 and F110 including the corresponding authentication code $A_{S+1, 2}$. Specifically, the wireless terminal 2 applies the hash function f2 to the key $K_{S+1, 2}$, thereby calculating a hash value. The wireless terminal 2 determines whether or not the calculated hash value matches the authentication code $A_{S+1, 2}$ in the data frame F109. If the calculated hash value matches the authentication code $A_{S+1, 2}$, the wireless terminal 2 determines that the authenticity of the data frame F109 is confirmed, and sends the data portion of the data frame F109 to the upper layer.

On the other hand, if the calculated hash value does not match the authentication code $A_{S+1, 2}$, the wireless terminal 2 determines that the authenticity of the data frame F109 is not confirmed, and discards the data frame F109. Thus, the data portion of the data frame F109 is not sent to the upper layer.

In a similar manner, the wireless terminal 2 can verify the authenticity of the data frame F110 and send the data portion of the authenticity-confirmed data frame F110 to the upper layer.

Furthermore, the wireless terminal 2 verifies the authenticity of the data frame F114 by using the authentication code $A_{S+1, 0}$ in the data frame F114 and the authenticity-confirmed key $K_{S+1, 0}$ that corresponds to the authentication code $A_{S+1, 0}$. If the additional information frame F112 has been received and the authenticity-confirmed key $K_{S+1, 0}$ has been acquired, the wireless terminal 2 verifies the authenticity of the data frame F114 using the key $K_{S+1, 0}$ and the authentication code $A_{S+1, 0}$ in the data frame F114.

Specifically, the wireless terminal 2 applies the hash function f2 to the key $K_{S+1, 0}$, thereby calculating a hash value. The wireless terminal 2 determines whether or not the calculated hash value matches the authentication code $A_{S+1, 0}$ in the data frame F114. If the calculated hash value matches the authentication code $A_{S+1, 0}$, the wireless terminal 2 determines that the authenticity of the data frame F114 is confirmed, and sends the data portion of the data frame F114 to the upper layer. If the calculated hash value does not match the authentication code $A_{S+1, 0}$, the wireless terminal 2 determines that the authenticity of the data frame F114 is not confirmed, and discards the data frame F114. Thus, the data portion of the data frame F114 is not sent to the upper layer.

As above, in the sequence S+1, the authenticity of each of the transferred data frames F109 to F111, F113 and F114, and the authenticity of the transferred additional information frame F112 are guaranteed using the six keys $K_{S+1, 0}$, $K_{S+1, 1}$, $K_{S+1, 2}$, $K_{S+1, 3}$, $K_{S+1, 4}$ and $K_{S+1, 5}$ that constitute the one-way key chain. Furthermore, with the additional information frame F112, the three keys $K_{S+1, 0}$, $K_{S+1, 1}$ and $K_{S+2, 5}$, which are included in a head information frame F115 in the following sequence S+2, may be transferred.

(Sequence S+2)

In the sequence S+2, frames are transferred from the wireless base station 1 to the wireless terminal 2 in a similar manner to the sequences S and S+1. The wireless base station 1 may transmit the head information frame F115 and then transmit a data frame F116 and an additional information frame F117 by using the six keys $K_{S+2, 0}$, $K_{S+2, 1}$, $K_{S+2, 2}$, $K_{S+2, 3}$, $K_{S+2, 4}$ and $K_{S+2, 5}$ that constitute the one-way key chain. The head information frame F115 includes the three keys $K_{S+1, 0}$, $K_{S+1, 1}$ and $K_{S+2, 5}$. The data frame F116 includes, for example, an authentication code $A_{S+2, 2}$ and the key $K_{S+2, 4}$. The additional information frame F117 includes, for example, the authentication code $A_{S+2, 2}$, the key $K_{S+2, 4}$, and the three keys $K_{S+2, 0}$, $K_{S+2, 1}$ and $K_{S+3, 5}$.

The wireless terminal 2 verifies the authenticity of each key included in each of received frames. Then, the wireless terminal 2 can verify the authenticity of the received data frame F116 and the authenticity of the received additional information frame F117 by using the authenticity-confirmed keys $K_{S+2, 0}$, $K_{S+2, 1}$, $K_{S+2, 2}$, $K_{S+2, 3}$, $K_{S+2, 4}$ and $K_{S+2, 5}$. The wireless terminal 2 can acquire a correct data portion from the authenticity-confirmed data frame F116. Furthermore, the wireless terminal 2 can acquire the authenticity-confirmed three keys $K_{S+2, 0}$, $K_{S+2, 1}$, and $K_{S+3, 5}$ from the authenticity-confirmed additional information frame F117.

As above, in the sequence S+2, the authenticity of the transmitted data frame F116 and the authenticity of the additional information frame F117 are guaranteed using the six keys $K_{S+2, 0}$, $K_{S+2, 1}$, $K_{S+2, 2}$, $K_{S+2, 3}$, $K_{S+2, 4}$ and $K_{S+2, 5}$ that constitute the one-way key chain. Furthermore, with the additional information frame F117, the three keys $K_{S+2, 0}$, $K_{S+2, 1}$ and $K_{S+3, 5}$, which are included in a head information frame in the following sequence S+3, may be transferred.

Figure 9:
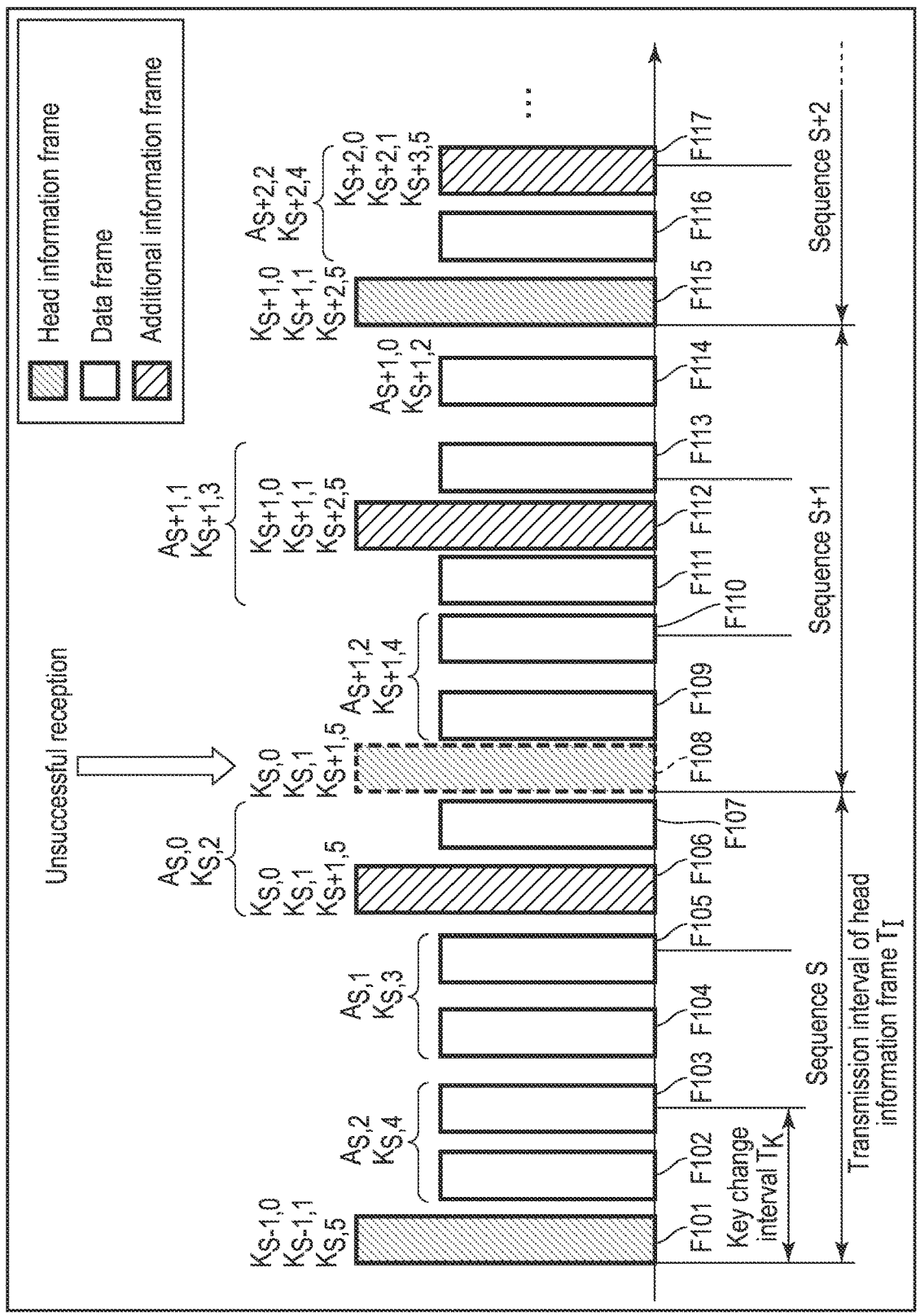
FIG. 9 is a diagram illustrating an example where reception of head information frame is not successful in the frame sequence of FIG. 8.

With reference to FIG. 9, an example where the wireless terminal 2 fails in reception of the head information frame F108 of the sequence S+1 will be explained. The wireless terminal 2 may fail in reception of the head information frame F108 because of an error on a radio path, for example.

Note that the order and the configuration of the frames F101 to F117 transmitted by the wireless base station 1 is the same as in FIG. 8. Furthermore, it is assumed that the wireless terminal 2 can receive frames other than the head information frame F108 correctly.

If reception of the head information frame F108 is not successful, the wireless terminal 2 cannot acquire the three keys $K_{S, 0}$, $K_{S, 1}$ and $K_{S+1, 5}$. If there is not an authenticity-confirmed key $K_{S+1, 5}$, the wireless terminal 2 cannot verify the authenticity of the key $K_{S+1, 4}$, the authenticity of the key $K_{S+1, 3}$ and the authenticity of the key $K_{S+1, 2}$. The key $K_{S+1, 4}$ is included in each of the data frames F109 and F110 that are received after the head information frame F108. The key $K_{S+1, 3}$ is included in all the data frames F111 and F113 and the additional information frame 112 that are received after the head information frame F108. The key $K_{S+1, 2}$ is included in the data frame F114 received after the head information frame F108. Further, if there not the authenticity-confirmed key $K_{S+1, 5}$, the wireless terminal 2 cannot acquire data portions from the data frames F109, F111, F113 and F114, and cannot acquire the keys $K_{S+1, 0}$, $K_{S+1, 1}$ and $K_{S+2, 5}$ from the additional information frame F112.

However, the wireless terminal 2 of the present embodiment receives the additional information frame F106 in the previous sequence S, and acquires the authenticity-confirmed key $K_{S+1, 5}$. Thus, even if the reception of the head information frame F108 is not successful, the wireless terminal 2 can verify, using the key $K_{S+1, 5}$ acquired from the additional information frame F106, the authenticity of the key $K_{S+1, 4}$ in the data frames F109 and F110, the authenticity of the key $K_{S+1, 3}$ in the data frames F111 and F113 and the additional information frame F112, and the authenticity of the key $K_{S+1, 2}$ in the data frame F114. Furthermore, the wireless terminal 2 can acquire, from the additional information frame F112 including the authenticity-confirmed key $K_{S+1, 3}$, the authenticity-confirmed keys $K_{S+1, 0}$, $K_{S+1, 1}$ and $K_{S+2, 5}$. Thus, the wireless terminal 2 can acquire the data portions from the data frames F109 to F111, F113 and F114 each including one of the authentication codes $A_{S+1, 2}$, $A_{S+1, 1}$ and $A_{S+1, 0}$ that correspond to the keys $K_{S+1, 2}$, $K_{S+1, 1}$ and $K_{S+1, 0}$, respectively.

Specifically, the wireless terminal 2 verifies the authenticity of the data frame F109 using the authenticity-confirmed key $K_{S+1, 2}$ and the authentication code $A_{S+1, 2}$ in the data frame F109. If the authenticity of the data frame F109 is confirmed, the wireless terminal 2 sends the data portion of the data frame F109 to the upper layer. The wireless terminal 2 verifies the authenticity of the data frame F110 using the authenticity-confirmed key $K_{S+1, 2}$ and the in authenticity code $A_{S+1, 2}$ in the data frame F110. If the authenticity of the data frame F110 is confirmed, the wireless terminal 2 sends the data portion of the data frame F110 to the upper layer.

The wireless terminal 2 acquires the three keys $K_{S+1, 0}$, $K_{S+1, 1}$ and $K_{S+2, 5}$ from the additional information frame F112 that includes the authenticity-confirmed key $K_{S+1, 3}$. The authenticity of the additional information frame F112 has been confirmed using the public key of the wireless base station 1 with a certification by CA and the digital signature by the private key of the wireless base station 1. Thus, the authenticity of each of the acquired three keys $K_{S+1, 0}$, $K_{S+1, 1}$ and $K_{S+2, 5}$ is confirmed. Note that the three keys $K_{S+1, 0}$, $K_{S+1, 1}$ and $K_{S+2, 5}$ may be acquired from the head information frame F115 of the following sequence S+2.

The wireless terminal 2 verifies the authenticity of the data frame F111 using the authenticity-confirmed key $K_{S+1, 1}$ and the authentication code $A_{S+1, 1}$ in the data frame F111. If the authenticity of the data frame F111 is confirmed, the wireless terminal 2 sends the data portion in the data frame F111 to the upper layer. The wireless terminal 2 verifies the authenticity of the data frame F113 using the authenticity-confirmed key $K_{S+1, 1}$ and the authentication code $A_{S+1, 1}$ in the data frame F113. If the authenticity of the data frame F113 is confirmed, the wireless terminal 2 sends the data portion in the data frame F113 to the upper layer.

Furthermore, the wireless terminal 2 verifies the authenticity of the data frame F114 using the authenticity-confirmed key $K_{S+1, 0}$ and the authentication code $A_{S+1, 0}$ in the data frame F114. If the authenticity of the data frame F114 is confirmed, the wireless terminal 2 sends the data portion in the data frame F114 to the upper layer.

Thus, even if the reception of the head information frame F108 is not successful, the wireless terminal 2 uses the key $K_{S+1, 5}$ acquired from the additional information frame F106 of the previous sequence S to acquire the data portions from the following data frames F109 to F111, F113 and F114, and to acquire the keys $K_{S+1, 0}$, $K_{S+1, 1}$ and $K_{S+2, 5}$ from the additional information frame F112.

With the above-described configuration, the wireless system including the wireless base station 1 and the wireless terminal 2 of the present embodiment can increase a possibility that data can be correctly transferred. The wireless base station 1 transmits a key required for verification of the authenticity of a data frame in a certain period (sequence) with not only the head information frame of the period but also the additional information frame in the previous period. If the wireless terminal 2 receives at least one of the head information frame and the additional information frame, the wireless terminal 2 can verify the authenticity of the data frame in the period.

Thus, as compared to a configuration where only a head information frame is transferred from the wireless base station 1 to the wireless terminal 2 and an additional information frame is not transferred, in the present embodiment, a possibility that a key that is required for verification of the authenticity of a data frame in a certain period is transferred from the wireless base station 1 to the wireless terminal 2 can be increased. Thus, in the present embodiment, a possibility that data is transferred correctly from the wireless base station 1 to the wireless terminal 2 can be increased.

Figure 10:
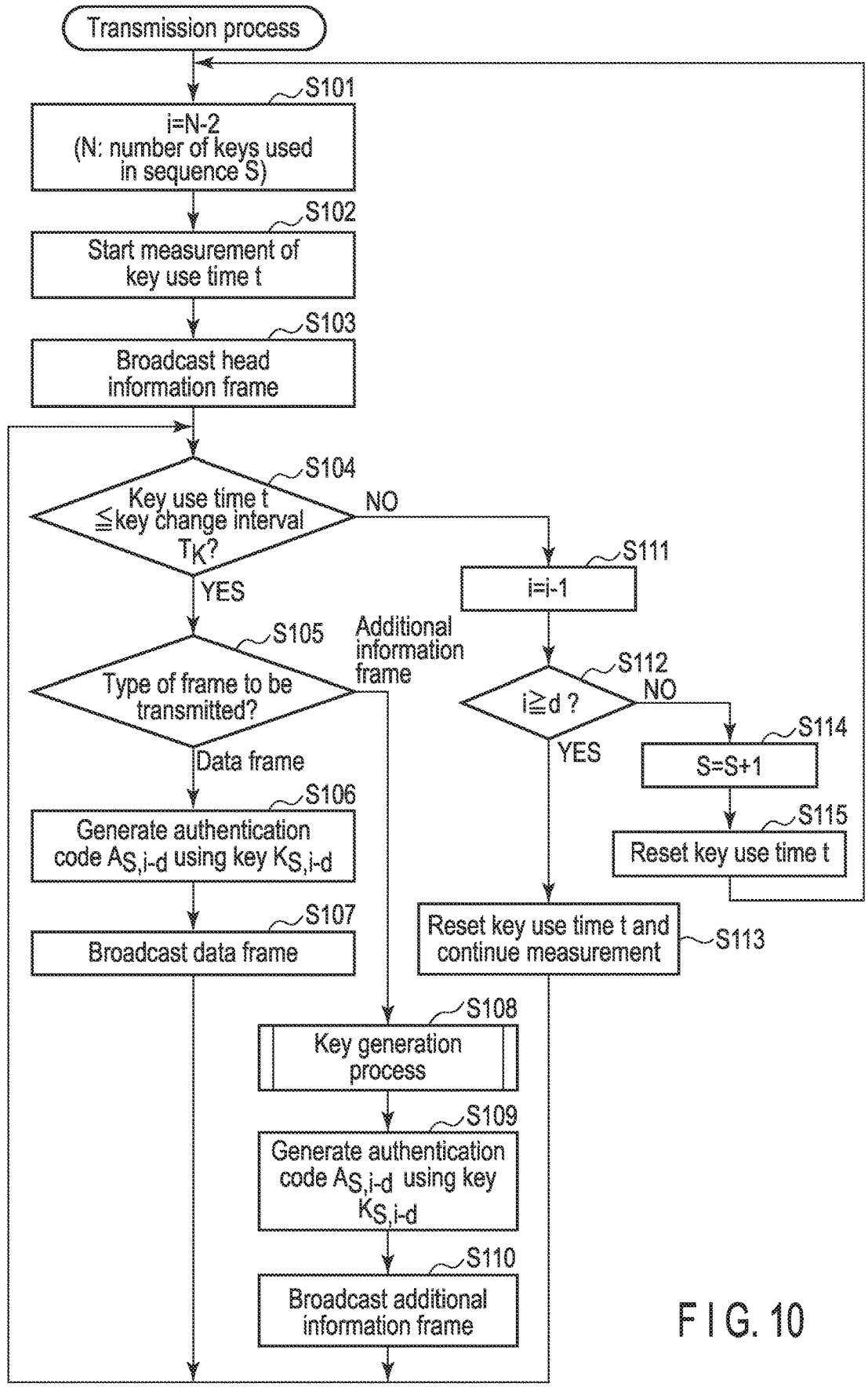
FIG. 10 is a flowchart of an example of the procedure of a transmission process executed in the transmitter wireless communication apparatus of FIG. 2.

An example of the procedure of a transmission process executed in the wireless base station 1 will be explained with reference to a flowchart of FIG. 10. In this example, the wireless base station 1 transmits frames of a sequence S using N keys $K_{S, N-1}$, $K_{S, N-2}$, ..., $K_{S, 1}$ and $K_{S, 0}$.

Firstly, the wireless base station 1 sets N−2 to a variable i (step S101). The wireless base station 1 starts measurement of a current key use time t (hereinafter referred to as key use time t) (step S102). Then, the wireless base station 1 broadcasts a head information frame of the sequence S (step S103). The head information frame includes the key $K_{S-1, 0}$, the Key $K_{S-1, 1}$ and the key $K_{S, N-1}$. The detailed configuration of the head information frame is described above with reference to FIG. 5.

Then, the wireless base station 1 determines whether or not the key use time t is equal to or shorter than a key exchange interval $T_K$ (step S104). If the key use time t is equal to or shorter than the key change interval $T_K$ (YES in step S104), the wireless base station 1 determines whether the type of a frame to be transmitted is a data frame or an additional information frame step S105). The wireless base station 1 determines, for example, that an additional information frame should be transmitted at a predetermined timing in the sequence S and a data frame should be transmitted in other timings. Alternatively, the wireless base station 1 may determine that a data frame should be transmitted when there is data to be broadcasted and an additional information frame should be transmitted when there is no data (that is, in an idle time).

If the type of the frame to be transmitted is a data frame (data frame in step S105), the wireless base station 1 generates an authentication code $A_{S,\ i-d}$ using the key $K_{S,\ i-d}$ (step S106). The wireless base station 1 appends a hash value, which is calculated using, for example, a hash function and the key $K_{S,\ i-d}$, as the authentication code $A_{S,\ i-d}$ to a data portion to be transmitted to the wireless terminal 2 in the data frame. Then, the wireless base station 1 broadcasts the data frame (step S107). The data frame includes, in addition to the data portion, the key $K_{S,\ i}$ and the authentication code $A_{S,\ i-d}$. The detailed configuration of the data frame is described above with reference to FIG. 6.

Furthermore, if the type of the frame to be transmitted is an additional information frame (additional information frame of step S105), the wireless base station 1 executes a key generation process to generate keys usable in the following sequence S+1 (step S108). In the key generation process, the keys usable in the sequence S+1 (that is, a one-way key chain) are generated. If the keys usable in the following sequence S+1 have already been generated, the wireless base station 1 skips step S108. The detailed procedure of the key generation process be described later with reference to the flowchart of FIG. 11.

Then, the wireless base station 1 generates an authentication code $A_{S,\ i-d}$ using the key $K_{S,\ i-d}$ (step S109). The wireless base station 1 appends a hash value as the authentication code $A_{S,\ i-d}$, which is calculated using, for example, a hash function and the key $K_{S,\ i-d}$, to information to be broadcasted in the additional information frame (hereinafter referred to as information portion). The information portion includes, for example, the keys $K_{S,\ 0}$, $K_{S,\ 1}$ and $K_{S+1,\ N-1}$, which are information to be broadcasted in a head information frame of the following sequence S+1. Then, the wireless base station 1 broadcasts the additional information frame (step S110). The additional information frame includes, in addition to the information portion, the key $K_{S,\ i}$ and the authentication code $A_{S,\ i-d}$. The detailed configuration of the additional information frame is described above with reference to FIG. 7.

After broadcasting the data frame in step S107, or after broadcasting the additional information frame in step S110, the wireless base station 1 returns to step S104 to repeat a process of broadcasting a data frame or an additional information frame until the key use time t reaches the key change interval $T_K$.

If the key use time t exceeds the key change interval $T_K$ (NO in step S104), the wireless base station 1 subtracts one from the variable i (step S111). Then, the wireless base station 1 determines whether the variable i is equal to or greater than the key delay interval d (step S112). This corresponds to determining whether the sequence S ends.

If the variable i is equal to or greater than the key delay interval d (YES in step S112), the wireless base station 1 resets the key use time, continues the measurement (step S113), and returns to step S104. That is, the wireless base station 1 performs a process for broadcasting a data frame or an additional information frame using the next key.

On the other hand, if the variable i is less than the key delay interval d (NO in step S112), the wireless base station 1 adds one to the sequence number S (step S114). Then, the wireless base station 1 resets the key use time t (step S115), and returns to step S101. Thus, the wireless base station 1 may broadcast frames of next sequence through the procedure similar to the above.

Through the above transmission process, the wireless base station 1 can broadcast frames using keys for each sequence. The authenticity of a data frame and the authenticity of an additional information frame can be verified using the keys.

Figure 11:
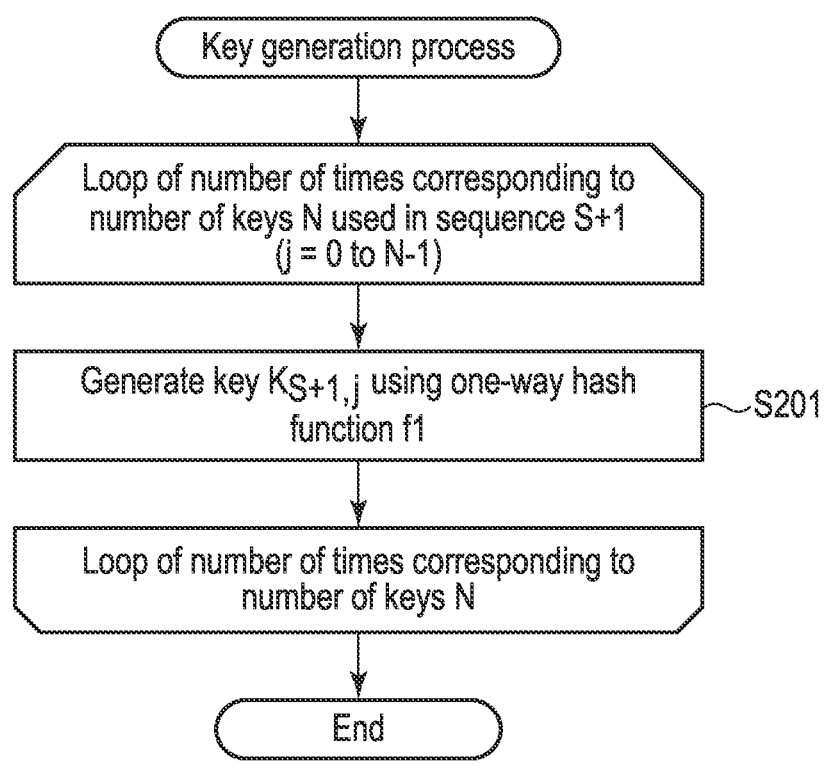
FIG. 11 is a flowchart of an example of the procedure of a key generation process included in the transmission process of FIG. 10.

FIG. 11 is a flowchart of an example of the procedure of a key generation process executed in the wireless base station 1. The key generation process corresponds to step S108 of the aforementioned transmission process in the flowchart of FIG. 10. In this example, N keys usable in the sequence S+1 are generated.

The wireless base station 1 generates a key $K_{S+1,\ j}$ using a one-way hash function f1 in each of N times loop process of increasing a variable j from 0 to N−1 by one (step S201). Specifically, if the variable j is equal to 0, the wireless base station 1 applies the one-way hash function f1 to, for example, a random initial value (random seed), thereby generating a key $K_{S+1,\ 0}$. Furthermore, if the variable j exceeds 0, the wireless base station 1 applies the one-way hash function f1 to the already-generated key $K_{S+1,\ j-1}$, thereby generating a key $K_{S+1,\ j}$.

Through the above key generation process, the wireless base station 1 can generate the N keys usable in the sequence S+1.

The flowchart of FIG. 12 illustrates an example of the procedure of a reception process executed in the wireless terminal 2. In this example, the wireless terminal 2 receives frames of a sequence S from the wireless base station 1.

Firstly, the wireless terminal 2 determines whether or not a head information frame of the sequence S has been received (step S301). The wireless terminal 2 can determine whether or not the head information frame of the sequence S is received on the basis of header information appended to a received frame or the sequence number included in the frame.

If a head information frame of the sequence S has been received (YES ins step S301), the wireless terminal 2 executes a head information frame process for verifying the authenticity of the head information frame and processing the frame (step S302). An example of the head information frame process will be described later with reference to the flowchart of FIG. 13.

Then, the wireless terminal 2 determines whether or not the authenticity of the head information frame is confirmed in the head information frame process (step S303). If the authenticity of the head information frame is not confirmed (NO in step S303), the wireless terminal 2 determines whether or not the authenticity of a key $K_{S,\ N-1}$ was already confirmed (step S304). This means that the wireless terminal 2 determines whether or not an authenticity-confirmed key $K_{S,\ N-1}$ has been obtained from an information frame different from the head information frame of the sequence S (for example, an additional information frame of the sequence S−1).

If the authenticity of the head information frame is confirmed (YES in step S303), or if the authenticity of the key $K_{S,\ N-1}$ was already confirmed (YES in step S304), the wireless terminal 2 determines whether or not a data frame has been received (step S305). If a data frame has been received (YES in step S305), the wireless terminal 2 executes a data frame process to process the data frame (step S306). The procedure of the data frame process will be described later with reference to the flowchart of FIG. 14.

If a data frame is not received (NO in step S305), the wireless terminal 2 determines whether or not an additional information frame has been received (step S307). If an additional information frame has been received (YES in step S307), the wireless terminal 2 executes an additional information frame process to process the additional information frame (step S308). The procedure of the additional information frame process be described later with reference to the flowchart of FIG. 16.

After the data frame process of step S306 is executed, or after the additional information frame process of step S308 is executed, or if an additional information frame is not received (NO in step S307), the wireless terminal 2 determines whether or not the period of the sequence S ends (step S309). The wireless terminal 2 can determine whether or not the current time is within the period of the sequence S using, for example, the time stamp included in the head information frame and the transmission Interval of the head information frame $T_f$.

If the period of the sequence S does not end (NO in step S209), the wireless terminal 2 returns to step S305 to continue a process of a data frame and an additional information frame received in the period of the sequence S.

If the period of the sequence S ends (YES in step S309), the wireless terminal 2 adds one to the sequence number S (step S310), and returns to step S301. Thus, the wireless terminal 2 may receive and process frames of the following sequence.

Furthermore, if the authenticity of the key $K_{S,\ N-1}$ is not confirmed (NO in step S304), the wireless terminal 2 determines whether or not a data frame has been received (step S311). If a data frame has been received (YES step S311), since the authority of the head information frame is not confirmed and the authenticity of the key $K_{S,\ N-1}$ is not confirmed, the wireless terminal 2 buffers the received data frame to the RAM 23 (step S312). If a data frame is not received (NO in step S311), the wireless terminal 2 skips step S312.

Then, the wireless terminal 2 determines whether or not an additional information frame has been received (step S313). If an additional information frame has been received (YES in step S313), since the authenticity of the head information frame is not confirmed and the authenticity of the key $K_{S,\ N-1}$ is not confirmed, the wireless terminal 2 buffers the received additional information frame to the RAM 23 (step S314). If an additional information frame is not received (NO in step S313), the wireless terminal 2 skips step S314.

Then, the wireless terminal 2 determines whether or not the period of the sequence S ends (step S315). If the period of the sequence S does not end (NO in step S315), the wireless terminal 2 returns to step S311 to continue buffering of a data frame and an additional information frame received in the period of the sequence S.

If the period of the sequence S ends (YES in step S315), the wireless terminal 2 adds one to the sequence number S (step S316) and returns to step S301. Thus, the wireless terminal 2 may receive and process frames of the following sequence.

Through the above reception process, the wireless terminal 2 can correctly acquire data (information) from the data frame and the additional information frame received in the period of the sequence S if the authenticity of the head information frame of the sequence S, or if the authenticity of the key $K_{S,\ N-1}$ was already confirmed. Furthermore, if the authenticity of the head information frame of the sequence S is not confirmed and the authenticity of the key $K_{S,\ N-1}$ is not confirmed, the wireless terminal 2 buffers the data frame and the additional information frame received in the period of sequence S. Thus, the wireless terminal 2 can acquire, if the keys $K_{S,\ 0}$ and $K_{S,\ 1}$ are obtained from the head information frame of the following sequence S+1, the data portion from the buffered data frame retroactively using the keys $K_{S,\ 0}$ and $K_{S,\ 1}$.

Figure 13:
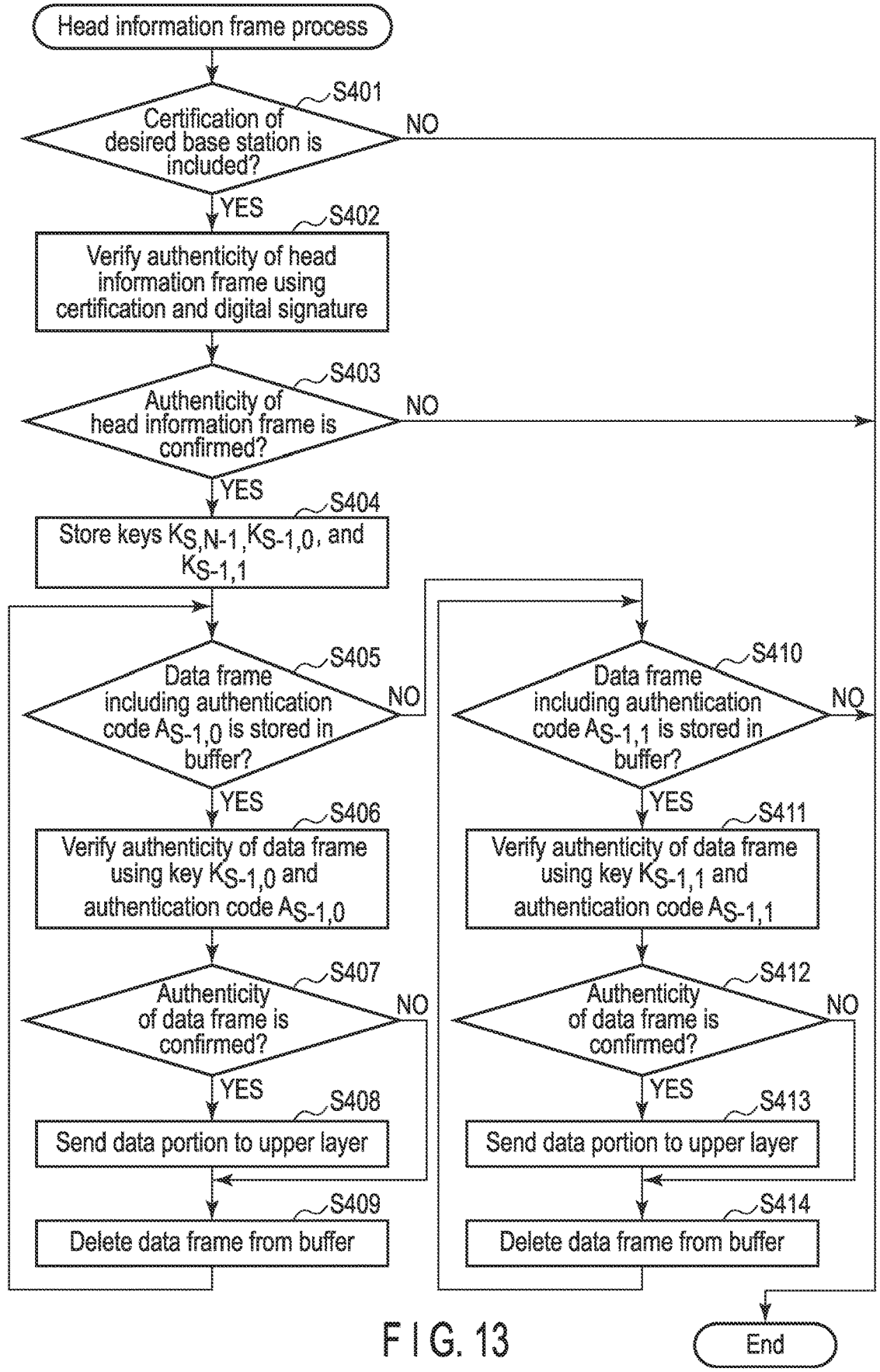
FIG. 13 is a flowchart of an example of the procedure of a head information frame process included in the reception process of FIG. 12.

FIG. 13 is a flowchart of an example of the procedure of a head information frame process executed in the wireless terminal 2. The head information frame process corresponds to step S302 in the aforementioned reception process in the flowchart of FIG. 12.

Firstly, the wireless terminal 2 determines whether or not a certification of a desired wireless base station 1 is included in the head information frame that has been received (step S401). The certification is, for example, a certification that is provided for the public key of the wireless base station 1 by CA.

If a certification of a desired wireless base station 1 is included in the head information frame (YES in step S401), the wireless terminal verifies the authenticity of the head information frame using the certification and a digital signature (step S402). Specifically, the wireless terminal 2 verifies the authenticity of the head information frame using a public key of CA that is preliminarily acquired, the certification of the public key of the wireless base station 1, and the digital signature by the private key of the wireless base station 1. Then, the wireless terminal 2 determines whether or not the authenticity of the head information frame is confirmed (step S403).

If a certification of a desired wireless base station 1 is not included in the head information frame (NO in step S401), or if the authenticity of the head information frame is not confirmed (NO in step S403), the wireless terminal 2 ends the head information frame process.

Furthermore, if the authenticity of the head information frame is confirmed (YES in step S403), the wireless terminal 2 stores three keys $K_{S,\ N-1}$, $K_{S-1,\ 0}$ and $K_{S-1,\ 1}$ included in the head information frame to, for example, the RAM 23 (step S404). Since the authenticity of the head information frame is confirmed, the three keys $K_{S,\ N-1}$, $K_{S-1,\ 0}$ and $K_{S-1,\ 1}$ are regarded as authenticity-confirmed keys. The key $K_{S,\ N-1}$ may be used to verify the authenticity of a data frame and an additional information frame received after the head information frame in the sequence S. Furthermore, the keys $K_{S-1,\ 0}$ and $K_{S-1,\ 1}$ may be used to verify the authenticity of a data frame that was received in the previous sequence S−1 and is buffered in the RAM 23.

Then, the wireless terminal 2 determines whether or not a data frame including an authentication code $A_{S-1,\ 0}$ is stored in the RAM (buffer) 23 (step S405). If a data frame including an authentication code $A_{S-1,\ 0}$ is stored in the RAM 23 (YES in step S405), the wireless terminal 2 verifies the authenticity of the data frame using the key $K_{S-,\ 0}$ stored in step S404 and the authentication code $A_{S-1,\ 0}$ in the data frame (step S406). That is, the wireless terminal 2 determines whether or not the authentication code $A_{S-1,\ 0}$ in the data frame is equivalent to an authentication code that is generated using the authenticity-confirmed key $K_{S-1,\ 0}$. If the authentication code $A_{S-1,\ 0}$ is equivalent to an authentication code that is generated using the key $K_{S-1,\ 0}$, the wireless terminal 2 determines that the authenticity of the data frame is confirmed. On the other hand, if the authentication code $A_{S-1,\ 0}$ is not equivalent to an authentication code that is generated using the key $K_{S-1, 0}$, the wireless terminal 2 determines that the authenticity of the data frame is not confirmed.

The wireless terminal 2 determines, in accordance with the verification in step S406, whether or not the authenticity of the data frame is confirmed (step S407). If the authenticity of the data frame is confirmed (YES in step S407), the wireless terminal 2 sends the data portion in the data frame to the upper layer (step S408). If the authenticity of the data frame is not confirmed (NO in step S407), the wireless terminal 2 skips step S408.

Then, the wireless terminal 2 deletes the data frame from the RAM 23 (step S409) and returns to step S405. Thus, after deleting the data frame from the RAM 23, the wireless terminal 2 may process another data frame stored in the RAM 23.

Furthermore, if a data frame including an authentication code $A_{S-1, 0}$ is not stored in the RAM 23 (NO in step S405), the wireless terminal 2 determines whether or not a data frame including an authentication code $A_{S-1, 1}$ is stored in the RAM 23 (step S410).

If a data frame including an authentication code $A_{S-1, 1}$ is stored in the RAM 23 (YES in step S410), the wireless terminal 2 verifies the authenticity of the data frame using the key stored in step S404 and the authentication code $A_{S-1, 1}$ in the data frame (step S411). That is, the wireless terminal 2 determines whether or not the authentication code $A_{S-1, 1}$ in the data frame is equivalent to an authentication code that is generated using the authenticity-confirmed key $K_{S-1, 1}$. If the authentication code $A_{S-1, 1}$ is equivalent to an authentication code that is generated using key $K_{S-1, 2}$, the wireless terminal 2 determines that the authenticity of the data frame is confirmed. On the other hand, if the authentication code $A_{S-1, 1}$ is not equivalent to an authentication code that is generated using the key $K_{S-1, 1}$, the wireless terminal 2 determines that that the authenticity of the data frame is not confirmed.

In accordance with the verification of step S411, the wireless terminal 2 determines whether or not the authenticity of the data frame is confirmed (step S412). If the authenticity of the data frame is confirmed (YES in step S412), the wireless terminal 2 sends the data portion in the data frame to the upper layer (step S413). If the authenticity of the data frame is not confirmed (NO in step S412), the wireless terminal 2 skips step S413.

Then, the wireless terminal 2 deletes the data frame from the buffer (step S414) and returns to step S410. Thus, after deleting the data frame from the RAM 23, the wireless terminal 2 may process another data frame stored in the RAM 23.

Furthermore, if a data frame including an authentication code $A_{S-1, 1}$ is not stored in the RAM 23 (NO in step S410), the wireless terminal 2 ends the head information frame process.

Through the above head information frame process, the wireless terminal 2 can verify the authenticity of the head information frame. Then, the wireless terminal 2 may verify the authenticity of the buffered data frame using the key included in the authenticity-confirmed head information frame and process the data frame. Note that, if the authenticity of the head information frame is confirmed, the wireless terminal 2 may discard an additional information frame in the RAM 23. This is because the additional information frame buffered in the previous sequence S−1 includes the same keys $K_{S, N-1}$, $K_{S-1, 0}$ and $K_{S-1, 1}$ as those in the head information frame of the sequence S.

Furthermore, if the authenticity of the head information frame is not confirmed, the wireless terminal 2 may discard a data frame and an additional information frame in the previous sequence S−1 that are stored in the RAM 23. Thus, the wireless terminal 2 can avoid execution of a process using the data portion of the data frame authenticity of which is not confirmed or the information in the additional information frame authenticity of which is not confirmed.

Figure 14:
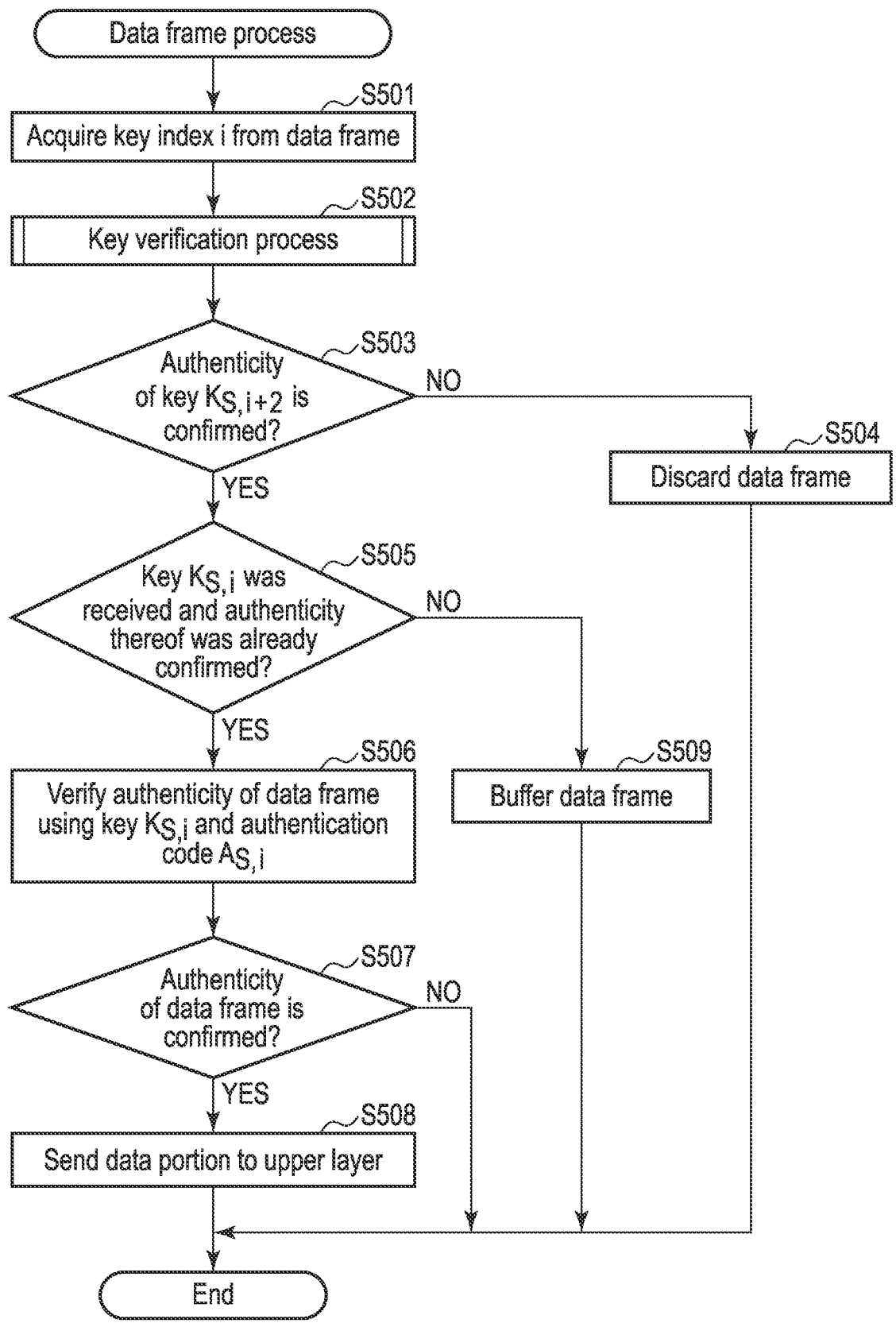
FIG. 14 is a flowchart of an example of the procedure of a data frame process included in the reception process of FIG. 12.

FIG. 14 is a flowchart of an example of the procedure of a data frame process executed in the wireless terminal 2. The data frame process corresponds to step S306 of the aforementioned reception process in the flowchart of FIG. 12.

Firstly, the wireless terminal 2 acquires a key index i from a data frame (step S501). The key index i indicates an index of a key $K_{S, i}$ used in generation of an authentication code $A_{S, i}$ included in the data frame.

Then, the wireless terminal 2 executes a key verification process to verify the authenticity of a key $K_{S, i+2}$ included in the data frame (step S502). The procedure of the key verification process will be described later with reference to a flowchart of FIG. 15.

Then, the wireless terminal 2 determines whether or not the authenticity of the key $K_{S, i+2}$ is confirmed in the key verification process of step S502, (step S503). If the authenticity of the key $K_{S, i+2}$ is not confirmed (NO in step S503), the wireless terminal 2 discards the data frame (step S504), and ends the data frame process.

If the authenticity of the key $K_{S, i+2}$ is confirmed (YES in step S503), the wireless terminal 2 determines whether or not the key $K_{S, i}$ was received and the authenticity thereof was confirmed (step S505). The key $K_{S, i}$ is a key corresponding to the authentication code $A_{S, i}$ included in the data frame.

If the key $K_{S, i}$ was received and the authenticity thereof was confirmed (YES in step S505), the wireless terminal 2 verifies the authenticity of the data frame using the key $K_{S, i}$ and the authentication code $A_{S, i}$ included in the data frame (step S506). That is, the wireless terminal 2 determines whether or not the authentication code $A_{S, i}$ in the data frame is equivalent to an authentication code that is generated using the authenticity-confirmed key $K_{S, i}$. If the authentication code $A_{S, i}$ is equivalent to an authentication code that is generated using the key $K_{S, i}$, the wireless terminal 2 determines that the authenticity of the data frame is confirmed. On the other hand, if the authentication code $A_{S, i}$ is not equivalent to an authentication code that is generated using the key $K_{S, i}$, the wireless terminal 2 determines that the authenticity of the data frame is not confirmed.

In accordance with the verification of step S506, the wireless terminal 2 determines whether or not the authenticity of the data frame is confirmed (step S507). If the authenticity at the data frame is confirmed (YES in step S507), the wireless terminal 2 sends the data portion in the data frame to the upper layer (step S508). In the upper layer, a process using the data portion is performed. If the authenticity of the data frame is not confirmed (NO in step S07), wireless terminal 2 skips step S508. Then, the wireless terminal 2 ends the data frame process.

Furthermore, if the key $K_{S, i}$ is not received, or if the authenticity of the received key $K_{S, i}$ is not confirmed (NO in step S505), the wireless terminal 2 buffers the data frame to the RAM 23 (step S509), and ends the data frame process.

Through the above data frame process, the wireless terminal 2 can verify the authenticity of the key $K_{S, i+2}$ included in the received data frame. Then, if the authenticity of the key $K_{S, i+2}$ is confirmed and the authenticity of the key $K_{S,i}$ corresponding to the authentication code $A_{S,i}$ included in the data frame was already confirmed, the wireless terminal 2 can perform a process to verify the authenticity of the data frame and acquire the data portion. On the other hand, if the authenticity of the key $K_{S,i}$ is not confirmed, the wireless terminal 2 can buffer the data frame to the RAM 23.

Figure 15:
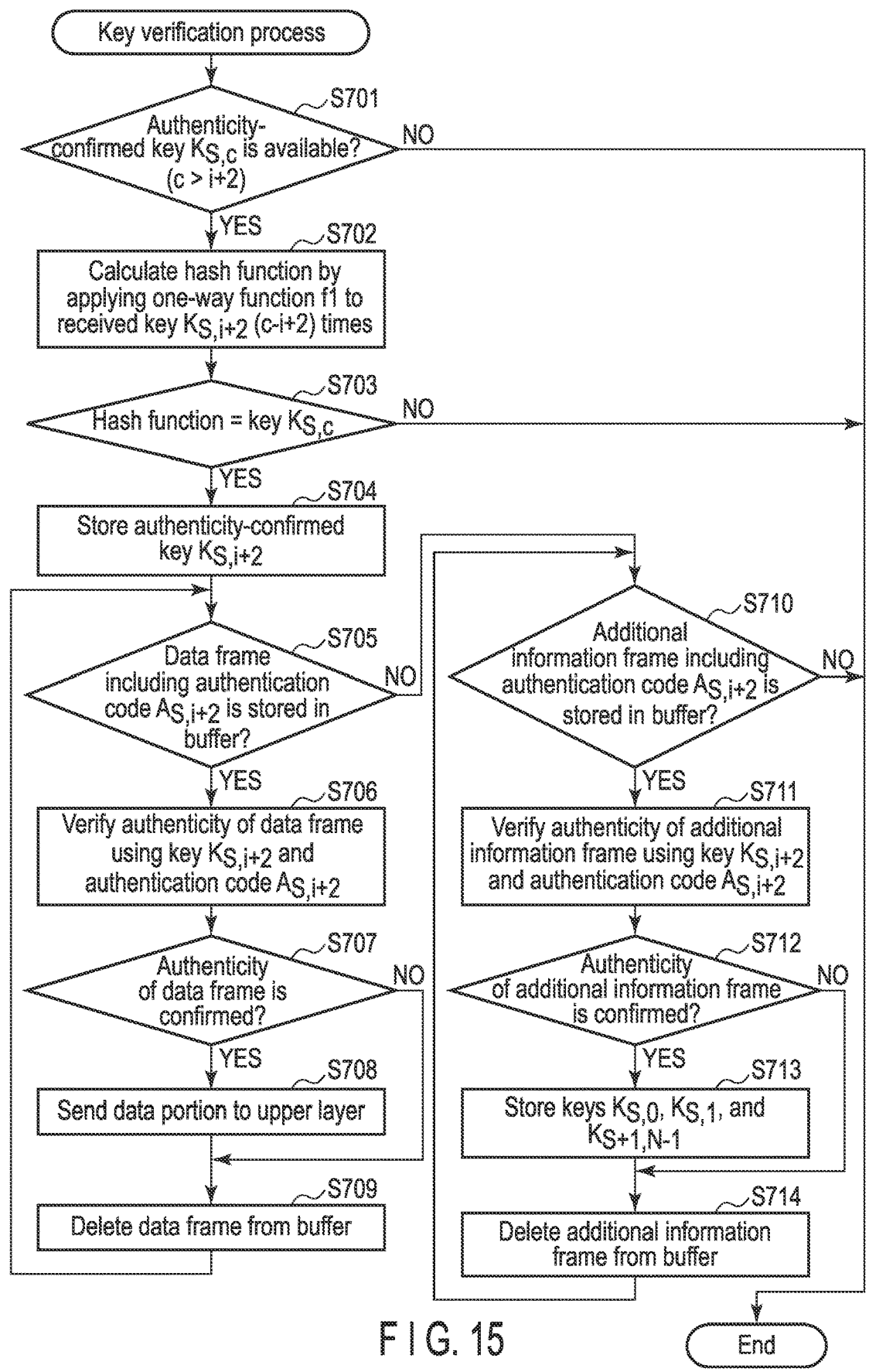
FIG. 15 is a flowchart of an example of the procedure of a key verification process Included in the data frame process of FIG. 14.

FIG. 15 is a flowchart of an example of the procedure of a key verification process executed in the wireless terminal 2. The key verification process corresponds to step S502 of the aforementioned data frame process in the flowchart of FIG. 14.

In the key verification process, the authenticity of a key $K_{S,i+d}$ included in a data frame or an additional information frame that has been received is verified. Then, if the authenticity of the key $K_{S,i+d}$ is confirmed, a data frame including an authentication code $A_{S,i+d}$ corresponding to the key $K_{S,i+d}$, and an additional information frame including the authentication code $A_{S,i+d}$, which are stored in the buffer 23, are processed. In this example, the key delay interval d is two.

Firstly, the wireless terminal 2 determines whether or not there is an authenticity-confirmed key $K_{S,c}$ (step S701), where c is a value greater than i+2 but less than N. Note that i is a key index included in a frame (specifically, a data frame or an additional information frame). N is the number of keys usable in transfer of frames of a sequence S. That is, the wireless terminal 2 specifies, using the index i+2 that is located posterior to the key index i by the delay interval d (=2), a key $K_{S,i+2}$ included in the frame. Then, the wireless terminal 2 determines whether or not an authenticity-confirmed key $K_{S,c}$ that is located posterior to the key $K_{S,i+2}$ in the generation order of the one-way key chain is stored.

If there is an authenticity-confirmed key (YES in step S701), the wireless terminal 2 calculates a hash function by applying a one-way hash function f1 (c−i+2) times to the key $K_{S,i+2}$ in the received frame (step S702). The wireless terminal 2 determines whether or not the calculated has function is the same as the authenticity-confirmed key $K_{S,c}$ (step S703).

If the calculated hash function is different from the authenticity-confirmed key $K_{S,c}$, (NO in step S703), or if there is no authenticity-confirmed key $K_{S,c}$ (NO in step S701), the wireless terminal 2 determines that the authenticity of the key $K_{S,i+2}$ is not confirmed, and ends the key verification process.

If the calculated hash function is the same as the authenticity-conformed key $K_{S,c}$, (YES in step S703), the wireless terminal 2 determines that the authenticity of the key $K_{S,i+2}$ is confirmed, and stores the key $K_{S,i+2}$ (step S704).

Then, the wireless terminal 2 determines whether or not a data frame including an authentication code $A_{S,i+2}$ is stored in the RAM (buffer) 23 (step S705). If a data frame including an authentication code $A_{S,i+2}$ is stored in the RAM 23 (YES in step S705), the wireless terminal 2 verifies the authentication of the data frame by using the key $K_{S,i+2}$ stored in step S704 and the authentication code $A_{S,i+2}$ in the data frame (step S706). That is, the wireless terminal 2 determines whether or not the authentication code $A_{S,i+2}$ in the data frame is equivalent to an authentication code that is generated using the authenticity-confirmed key $K_{S,i+2}$. If the authentication code $A_{S,i+2}$ is equivalent to an authentication code that is generated using the key $K_{S,i+2}$, the wireless terminal 2 determines the authenticity of the data frame is confirmed. On the other hand, if the authentication code $A_{S,i+2}$ is not equivalent to an authentication code that is generated using the key $K_{S,i+2}$, the wireless terminal 2 determines that the authenticity of the data frame is not confirmed.

In accordance with the verification of step S706, the wireless terminal 2 determines whether or not the authenticity of the data frame is confirmed (step S707). If the authenticity of the data frame is confirmed (YES in step S707), the wireless terminal 2 sends the data portion in the data frame to the upper layer (step S708). In the upper layer, a process using the data portion is performed. If the authenticity of the data frame is not confirmed (NO in step S707), the wireless terminal 2 skips step S708.

Then, the wireless terminal 2 deletes the data frame from the buffer (step S709), and returns to step S705. Thus, after deleting the data frame from the RAM 23, the wireless terminal 2 may process another frame stored in the RAM 23.

Furthermore, if a data frame including an authentication code $A_{S,i+2}$ is not stored in the RAM 23 (NO in step S705), the wireless terminal 2 determines whether or not an additional information frame including an authentication code $A_{S,i+2}$ is stored in the RAM 23 (step S710).

If an additional information frame including an authentication code $A_{S,i+2}$ is stored in the RAM 23 (YES in step S710), the wireless terminal 2 verifies the authenticity of the additional information frame by using the key $K_{S,i+2}$ stored in step S704 and the authentication code $A_{S,i+2}$ in the additional information frame (step S711). That is, the wireless terminal 2 determines whether or not the authentication code $A_{S,i+2}$ in the additional information frame is equivalent to an authentication code that is generated using the authenticity-confirmed key $K_{S,i+2}$. If the authentication code $A_{S,i+2}$ is equivalent to an authentication code that is generated using the key $K_{S,i+2}$, the wireless terminal 2 determines that the authenticity of the additional information frame is confirmed. On the other hand, if the authentication code $A_{S,i+2}$ is not equivalent to an authentication code that is generated using the key $K_{S,i+2}$, the wireless terminal 2 determines that the authenticity of the additional information frame is not confirmed.

In accordance with the verification of step S711, the wireless terminal 2 determines whether or not the authenticity of the additional information frame is confirmed (step S712). If the authenticity of the additional information frame is confirmed (YES in step S712), the wireless terminal 2 stores three keys $K_{S,0}$, $K_{S,1}$ and $K_{S+1,N-1}$ included in the information portion in the additional information frame (step S713). If the authenticity of the additional information frame is not confirmed (NO in step S712), the wireless terminal 2 skips stew S714.

Then, the wireless terminal 2 deletes the additional information frame from the RAM 23 (step S714), and returns to step S711. Thus, after deleting the additional information frame from the RAM 23, the wireless terminal 2 may process another additional information frame stored in the RAM 23.

If an additional information frame including an authentication code $A_{S,i+2}$ is not stored in the RAM 23 (NO in step S710), the wireless terminal 2 ends the key verification process.

Through the above key verification process, the wireless terminal 2 verifies the authenticity of the key $K_{S,i+2}$ included in the received frame. Then, the wireless terminal 2 may verify the authenticity of the buffered data frame and the authenticity of the buffered additional information frame by using the authenticity-confirmed key $K_{S,i+2}$ and process the frames.

Furthermore, if the authenticity of the key $K_{S,\,i+2}$ is not confirmed, the wireless terminal 2 determines that the received frame is an incorrect frame (for example, a data frame including a tampered data portion, or an additional information frame including a tampered information portion), and can discard the frame. Thus, the wireless terminal 2 can avoid execution of a process using a tampered data portion or a tampered information portion.

Figure 16:
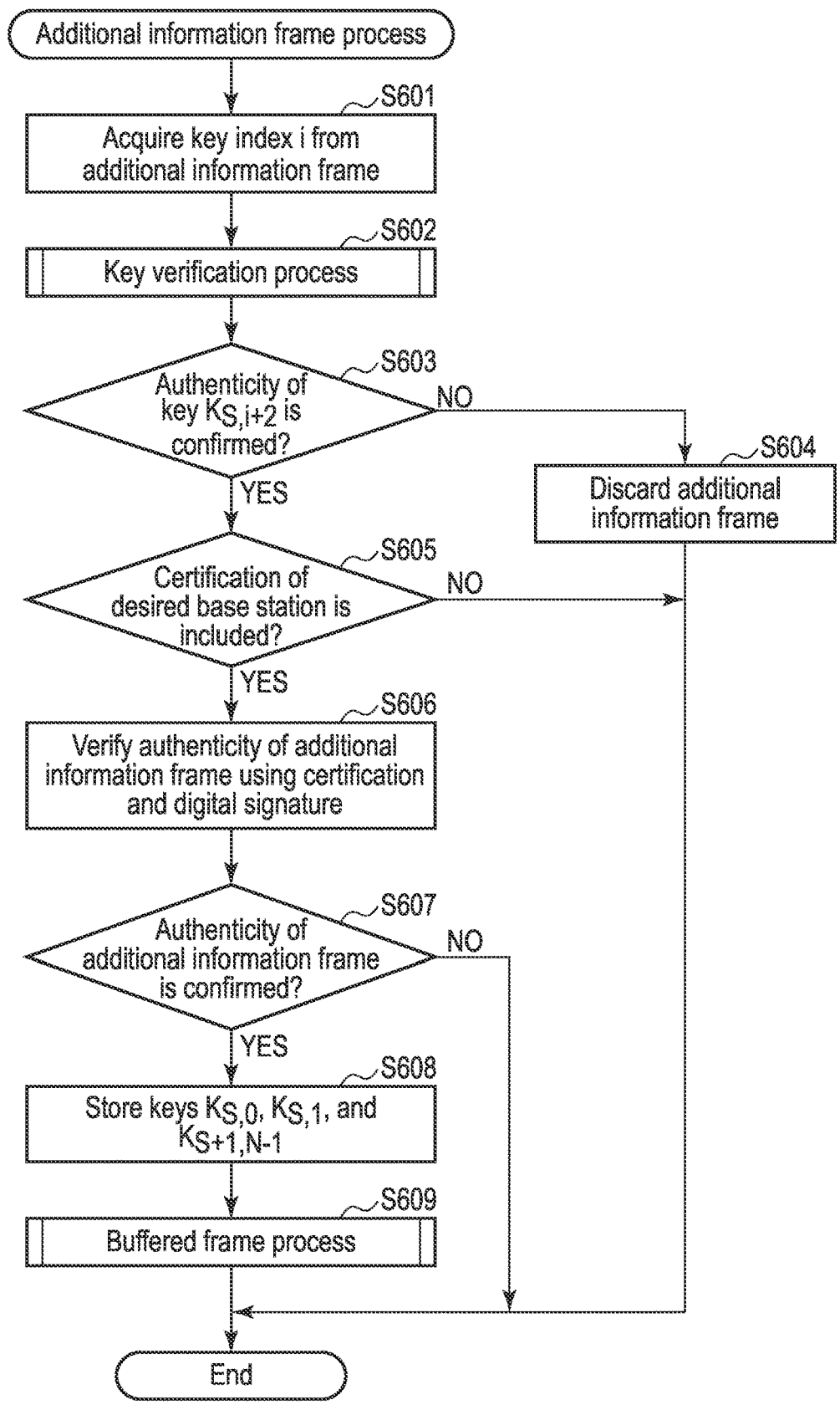
FIG. 16 is a flowchart of an example of the procedure of an additional information frame process included in the reception process of FIG. 12.

FIG. 16 is a flowchart of an example of the procedure of an additional information frame process executed in the wireless terminal 2. The additional information frame process corresponds to step S308 of the aforementioned reception process in the flowchart of FIG. 12.

Firstly, the wireless terminal 2 acquires a key index i from an additional information frame (step S601). The key index i indicates an index of a key $K_{S,\,i}$ used in generation of an authentication code $A_{S,\,i}$ included in the additional information frame.

Then, the wireless terminal 2 executes a key verification process to verify the authenticity of key $K_{S,\,i+2}$ included in the additional information frame (step S602). The procedure of the key verification process is described above with reference to the flowchart of FIG. 15.

Then, the wireless terminal 2 determines whether or not the authenticity of the key $K_{S,\,i+2}$ is confirmed in the key verification process of step S602 (step S603). If the authenticity of the key $K_{S,\,i+2}$ is not confirmed (NO in step S603), the wireless terminal 2 discards the additional information frame (step S604), and ends the additional information frame process. Since the wireless terminal 2 discards the additional information frame including the incorrect key $K_{S,\,i+2}$, the wireless terminal 2 can avoid execution of a process based on incorrect information.

Furthermore, if the authenticity of the key $K_{S,\,i+2}$ is confirmed (YES in step S603) the wireless terminal 2 determines whether or not the received additional information frame includes a certification of a desired wireless base station 1 (step S605). The certification is, for example, a certification provided for the public key of the wireless base station 1 by CA.

If the additional information frame includes a certification of a desired wireless base station 1 (YES in step S605), the wireless terminal 2 verifies the authenticity of the additional information frame using the certification and a digital signature (step S606). Specifically, the wireless terminal 2 verifies the authenticity of the additional information frame using a public key of CA that is preliminarily acquired, the certification of the public key of the wireless base station 1, and the digital signature by the private key of the wireless base station 1. Then, the wireless terminal 2 determines whether or not the authenticity of the additional information frame is confirmed (step S607).

If the additional information frame does not include a certification of a desired wireless base station 1 (NO in step S605), or if the authenticity of the additional information frame is not confirmed (NO in step S607), the wireless terminal 2 ends the additional information frame process.

If the authenticity of the additional information frame is confirmed (YES in step S607), the wireless terminal 2 stores three keys $K_{S,\,0}$, $K_{S,\,1}$ and $K_{S+1,\,N-1}$ included in the additional information frame to, for example, the RAM 23 (step S608). Since the authenticity of the additional information frame is confirmed, these three keys $K_{S,\,0}$, $K_{S,\,1}$ and $K_{S+1,\,N-1}$ are regarded as authenticity-confirmed keys. The key $K_{S,\,0}$ may be used to verify the authenticity of a data frame that includes an authentication code $A_{S,\,1}$ and is received in the sequence S. The key $K_{S,\,1}$ may be used to verify the authenticity of a data frame that includes an authentication code $A_{S,\,1}$ and is received in the sequence S. Furthermore, the key $K_{S+1,\,N-1}$ may be used to verify the authenticity of a data frame received in the following sequence S+1, and the authenticity of the additional information frame received in the following sequence S+1.

Then, the wireless terminal 2 executes a buffered frame process to process a data frame buffered in the RAM 23 (step S609), and ends the additional information frame process. In the buffered frame process, the authenticity of a data frame buffered in the RAM 23 is verified, and a data portion is acquired from the authenticity-confirmed data frame.

Figure 17:
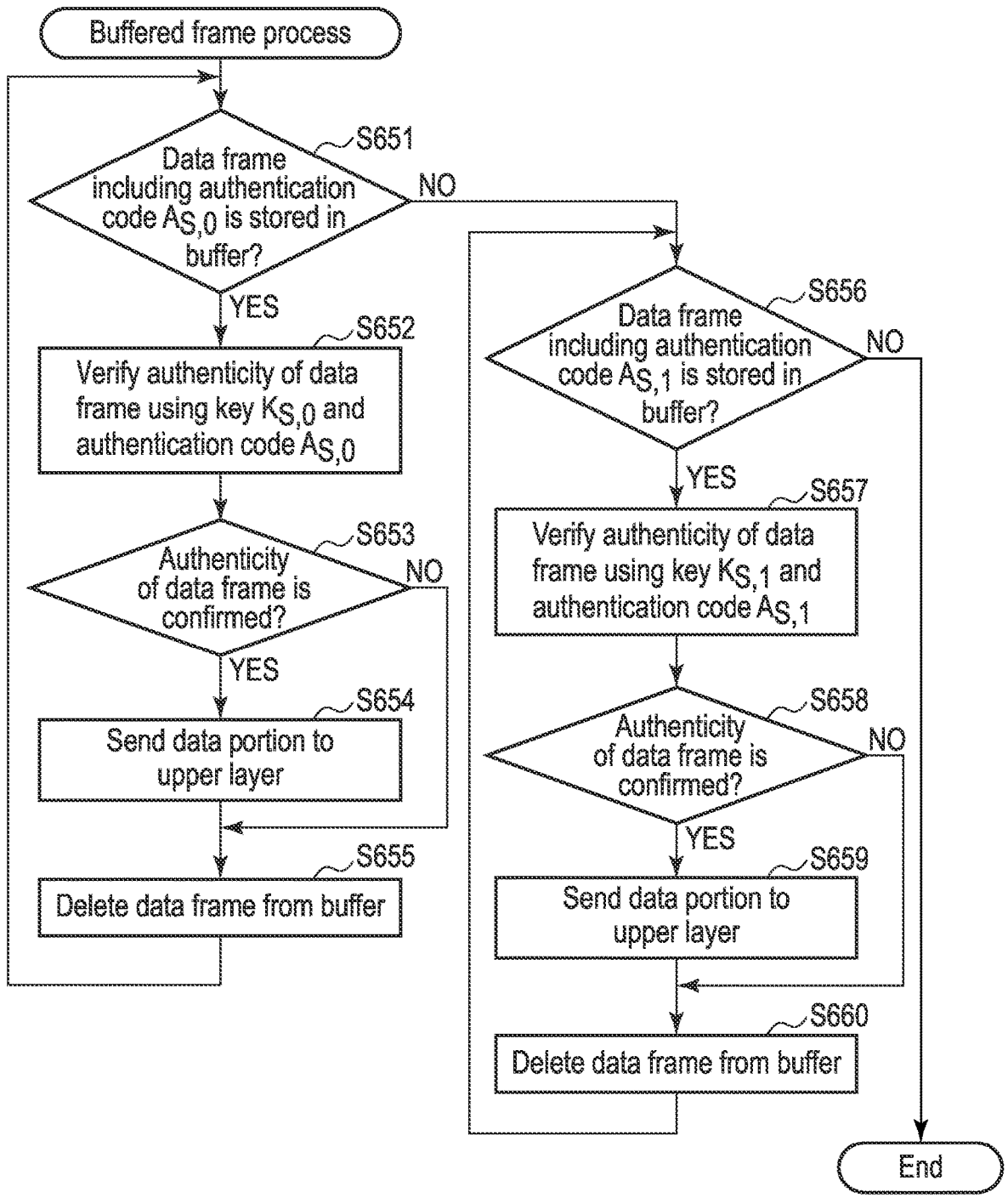
FIG. 17 is a flowchart of an example of the procedure of a buffered frame process included in the additional information frame process of FIG. 16.

FIG. 17 is a flowchart of an example of the procedure of a buffered frame process executed in the wireless terminal 2.

Firstly, the wireless terminal 2 determines whether or not a data frame including an authentication code $A_{S,\,0}$ is stored in the RAM (buffer) 23 (step S651). If a data frame including an authentication code $A_{S,\,0}$ is stored in the RAM 23 (YES in step 651), the wireless terminal 2 verifies the authenticity of the data frame by using a stored key $K_{S,\,0}$ (that is, key $K_{S,\,0}$ stored in step S608 in the additional information frame process of FIG. 16) and the authentication code $A_{S,\,0}$ in the data frame (step S652). That is, the wireless terminal 2 determines whether or not the authentication code $A_{S,\,0}$ in the data frame is equivalent to an authentication code that is generated using the authenticity-confirmed key $K_{S,\,0}$. If the authentication code $A_{S,\,0}$ is equivalent to an authentication code that is generated using the key $K_{S,\,0}$, the wireless terminal 2 determines that the authenticity of the data frame is confirmed. On the other hand, if the authentication code $A_{S,\,0}$ is not equivalent to an authentication code that is generated using the key $K_{S,\,0}$, the wireless terminal 2 determines that the authenticity of the data frame is not confirmed.

In accordance with the verification of step S652, the wireless terminal 2 determines whether or not the authenticity of the data frame is confirmed (step S653). If the authenticity of the data frame is confirmed (YES in step S653), the wireless terminal 2 sends the data portion in the data frame to the upper layer (step S654). If the authenticity of the data frame is not confirmed (NO in step S653), the wireless terminal 2 skips step S654.

Then, the wireless terminal 2 deletes the data frame from the RAM 23 (step S655), and returns to step S651. Thus, after deleting the data frame from the RAM 23, the wireless terminal 2 may process another data frame stored in the RAM 23.

Furthermore, if a data frame including an authentication code $A_{S,\,0}$ is not stored in the RAM 23 (NO in step S651), the wireless terminal 2 determines whether or not a data frame including an authentication code $A_{S,\,1}$ is stored in the RAM 23 (step S656).

If a data frame including an authentication code $A_{S,\,1}$ is stored in the RAM 23 (YES in step S656), the wireless terminal 2 verifies the authenticity of the data frame by using a stored key $K_{S,\,1}$ (that is, key $K_{S,\,1}$ stored in step S608 in the additional information frame process of FIG. 16) and the authentication code $A_{S,\,1}$ in the data frame (step S657). That is, the wireless terminal 2 determines whether or not the authentication code $A_{S,\,1}$ in the data frame is equivalent to an authentication code that is generated using the authenticity-confirmed key $K_{S,\,1}$. If the authentication code $A_{S,\,1}$ is equivalent to an authentication code that is generated using key $K_{S,\,1}$, the wireless terminal 2 determines that the authenticity of the data frame is confirmed. On the other hand, if the authentication code $A_{S,\,1}$ is not equivalent to an authentication code that is generated using the key $K_{S,1}$, the wireless terminal 2 determines that the authenticity of the data frame is not confirmed.

In accordance with the verification of step S657, the wireless terminal 2 determines whether or not the authenticity of the data frame is confirmed (step S658). If the authenticity of the data frame is confirmed (YES in step S658), the wireless terminal 2 sends the data portion in the data frame to the upper layer (step S659). If the authenticity of the data frame is not confirmed (NO in step S658), the wireless terminal 2 skips step S659.

Then, the wireless terminal 2 deletes the data frame from the RAM 23 (step S660), and returns to step S656. Thus, after deleting the data frame from the RAM 23, the wireless terminal 2 may process another data frame stored in the RAM 23.

Furthermore, if a data frame including an authentication code $A_{S,1}$ is not stored in the RAM 23 (NO in step S656), the wireless terminal 2 ends the buffered frame process.

Through the above buffered frame process, the wireless terminal 2 may verify the authenticity of a buffered data frame using the keys $K_{S,0}$ and $K_{S,1}$ authenticity of each of which is newly confirmed, and process the data frame.

(First Variation)

As described above, even if a head information frame of a certain sequence is not received, the wireless terminal 2 of the present embodiment can acquire a data portion from a data frame by receiving an additional information frame in a previous sequence. In the first variation of the present embodiment, the additional information frame may not include a public key of a wireless base station 1 with a certification by CA, a digital signature by a private key of the wireless base station 1, and a sequence number.

The additional information frame includes an authentication code. The wireless terminal 2 can verify the authenticity of the additional information frame using the authentication code and an authenticity-confirmed key corresponding to the authentication code.

A specific example will be explained with reference to FIG. 8 again. In the sequence S, the wireless terminal 2 verifies the authenticity of the head information frame F101 using the public key of the wireless base station 1 with a certification by CA and the digital signature by the private key of the wireless base station 1, and acquires the key $K_{S,5}$ from the authenticity-confirmed head information frame F101. The wireless terminal 2 can verify the authenticity of the key $K_{S,2}$ included in the additional information frame F106 using the authenticity-confirmed key $K_{S,5}$ (or key $K_{S,4}$ or $K_{S,3}$ authenticity of which is confirmed using the key $K_{S,5}$).

Then, if the authenticity of the key $K_{S,2}$ is confirmed, the wireless terminal 2 verifies the authenticity of the additional information frame F106 using the key $K_{S,0}$ and the authentication code $A_{S,0}$ in the additional information frame F106. Then, if the authenticity of the additional information frame F106 is confirmed, the wireless terminal 2 can acquire three authenticity-confirmed keys $K_{S,0}$, $K_{S,1}$ and $K_{S+1,5}$ from the additional information frame F106.

That is, without using the public key of the wireless base station 1 with a certification by CA and the digital signature by the private key of the wireless base station 1, the wireless terminal 2 can verify the authenticity of the additional information frame F106 and acquire the keys $K_{S,0}$, $K_{S,1}$ and $K_{S+2,5}$ from the authenticity-confirmed additional information frame F106. Thus, the additional information frame F106 may not include the public key of the wireless base station 1 with a certification by CA and the digital signature by the private key of the wireless base station 1.

Furthermore, the sequence number only indicates the number of the sequence S+1 that is next to the current sequence S (that is, S+1). That is, the sequence number included in the additional information frame F106 obviously indicates the number of the sequence S+1 next to the current sequence S, and thus, it may not be included in the additional information frame F106.

The additional information frame F112 of the sequence S+1 and the additional information frame F117 of the sequence S+2 may be configured as with the above additional information frame F106.

As can be understood from the above, according to the first variation of the present embodiment, information included in an additional information frame can be reduced while security and credibility are maintained. Thus, a load in the transmission process of the wireless base station 1, traffic of the radio path, and a load in the reception process of the wireless terminal 2 can be reduced.

Figure 18:
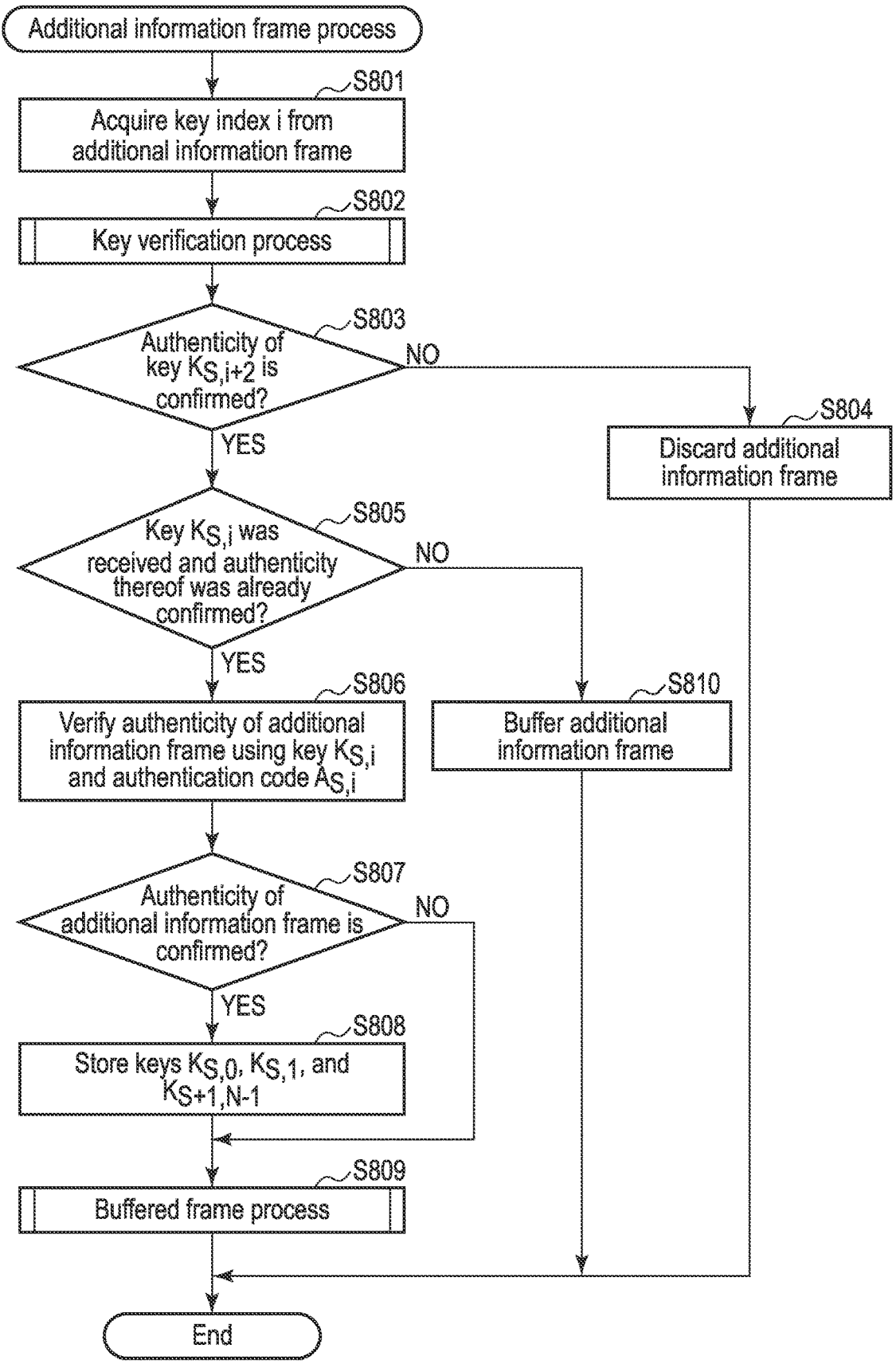
FIG. 18 is a flowchart of another example of the additional information frame process included in the reception process of FIG. 12.

FIG. 18 is a flowchart of another example of the procedure of the additional information frame process executed in the wireless terminal 2. The additional information frame process corresponds to step S308 of the aforementioned reception process in the flowchart of FIG. 12. Furthermore, in the additional information frame process described above with reference to the flowchart of FIG. 16, the authenticity of an additional information frame is confirmed using a certification and a digital signature. In contrast, in the additional information frame process of FIG. 18, the authenticity of an additional information frame is verified using a key $K_{S,i+2}$ and an authentication code $A_{S,i}$ included in the additional information frame, and an authenticity-confirmed key $K_{S,i}$. Note that steps S801 to S804 of FIG. 18 are the same as steps S601 to S604 of the aforementioned additional information frame process of FIG. 16.

If the authenticity of the key $K_{S,i+2}$ is confirmed in the key verification process (YES in step S803), the wireless terminal 2 determines whether or not the key $K_{S,i}$ was received and the authenticity thereof was confirmed (step S805). If the key $K_{S,i}$ was received and the authenticity thereof was confirmed (YES in step S805), the wireless terminal 2 verifies the authenticity of the additional information frame using the key $K_{S,i}$ and the authentication code $A_{S,i}$ that is included in the additional information frame (step S806). That is, the wireless terminal 2 determines whether or not the authentication code $A_{S,i}$ in the additional information frame is equivalent to an authentication code that is generated using the authenticity-confirmed key $K_{S,i}$. If the authentication code $A_{S,i}$ is equivalent to an authentication code that is generated using the key $K_{S,i}$, the wireless terminal 2 determines that the authenticity of the additional information frame is confirmed. On the other hand, if the authentication code $A_{S,i}$ is not equivalent to an authentication code that is generated using the key $K_{S,i}$, the wireless terminal 2 determines that the authenticity of the additional information frame is not confirmed.

In accordance with the verification of step S806, the wireless terminal 2 determines whether or not the authenticity of the additional information frame is confirmed (step S807). If the authenticity of the additional information frame is confirmed (YES in step S807), the wireless terminal 2 stores three keys $K_{S,0}$, $K_{S,1}$ and $K_{S+1,N-1}$ included in the information of the additional information frame to, for example, the RAM 23 (step S808). If the authenticity of the additional information frame is not confirmed (NO in step S807), the wireless terminal 2 skips step S808. Then, the wireless terminal 2 executes the buffered frame process (step S809), and ends the additional information frame process. The procedure of the buffered frame process is described above with reference to the flowchart of FIG. 17.

Furthermore, if the key $K_{S,\,i}$ is not received, or the authenticity of the received key $K_{S,\,i}$ is not confirmed (NO in step S805), the wireless terminal 2 buffers the additional information frame to the RAM 23 (step S810), ends the additional information frame process.

Through the above additional information frame process, the wireless terminal 2 can verify the authenticity of the key $K_{S,\,i+2}$ included in the received additional information frame. Then, if the authenticity of the key $K_{S,\,i+2}$ is confirmed and the authenticity of the key $K_{S,\,i}$ corresponding to the authentication code $A_{S,\,i}$ included in the additional information frame was already confirmed, the wireless terminal 2 can perform a process to verify the authenticity of the additional information frame and to acquire the keys $K_{S,\,0}$, $K_{S,\,1}$ and $K_{S+1,\,N-1}$ in the information portion. Furthermore, if the authenticity of the key $K_{S,\,i+2}$ is confirmed and the authenticity of the key $K_{S,\,i}$ is not confirmed, the wireless terminal 2 can buffer the additional information frame to the RAM 23.

(Second Variation)

Figure 19:
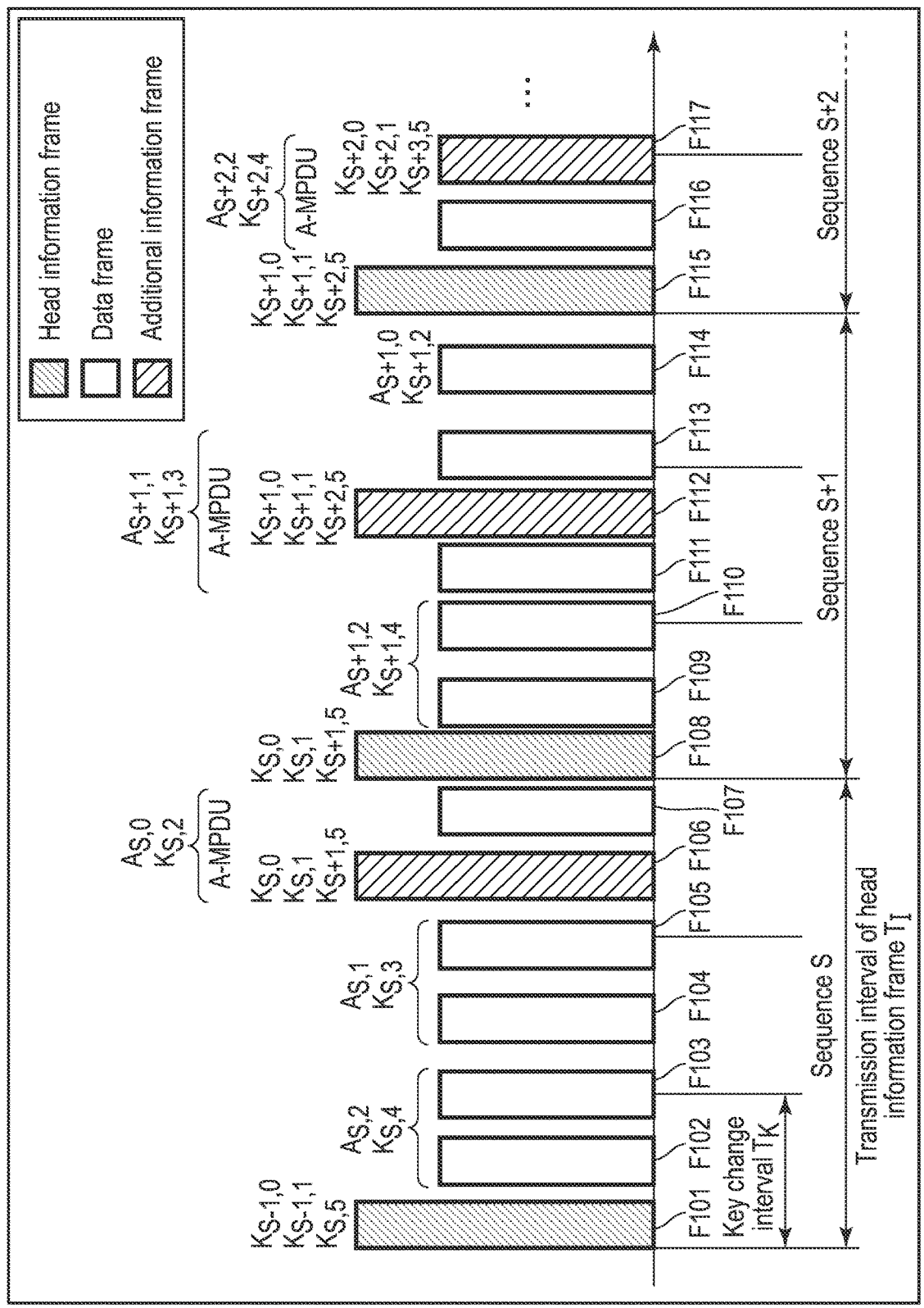
FIG. 19 is a diagram illustrating an example of frame sequences transferred between wireless communication apparatuses according to a variation of the embodiment.

An example of a frame sequence transferred between the wireless base station 1 and the wireless terminal 2 in the second variation of the present embodiment will be explained with reference to FIG. 19. The transmission order and configuration of frames F101 to F117 of FIG. 19 are described above with reference to FIG. 8.

The wireless base station 1 of the second variation broadcasts a data unit in which at least one data frame and an additional information frame, which are generated in a single key change interval $T_K$, are aggregated. The data unit is, for example, an aggregated MAC protocol data unit (A-MPDU). In the data unit, information pieces included in both the data frame and the additional information frame are aggregated. Thus, data amount can be reduced as compared to a case where the data frame and the additional information frame are transmitted as they are.

Specifically, the controller 11 of the wireless base station 1 generates, in the sequence S, for example, an A-MPDU in which the additional information frame F106 and the data frame F107, which are generated in the third key change interval $T_K$, are aggregated. The A-MPDU includes the authentication code $A_{S,\,0}$ and the key $K_{S,\,2}$ included in both the additional information frame F106 and the data frame F107 by aggregation. That is, the A-MPDU includes data of the additional information frame F106 and the data frame F107 except a combination of the authentication code $A_{S,\,0}$ and the key $K_{S,\,2}$. Furthermore, the controller 11 may generate the A-MPDU except at least the key $K_{S,\,2}$ in the additional information frame F106 or the key $K_{S,\,2}$ in the data frame F107 from the additional information frame F106 and the data frame F107. The transmitter 12 of the wireless base station 1 broadcasts the generated A-MPDU.

Then, the receiver 22 of the wireless terminal 2 receives the A-MPDU. The controller 21 of the wireless terminal 2 uses the combination of the authentication code $A_{S,\,0}$ and the key $K_{S,\,2}$ included in the A-MPDU as common information of the additional information frame F106 and the data frame F107. The process using the authentication code $A_{S,\,0}$ and the key $K_{S,\,2}$ is described above.

Thus, for example, in a case where the additional information frame F106 and the data frame F107 are transmitted separately, two combinations of the authentication code $A_{S,\,0}$ and the key $K_{S,\,2}$ are transmitted. On the other hand, in a case where the A-MPDU in which the additional information frame F106 and the data frame F107 are aggregated is transmitted, only one combination of the authentication code $A_{S,\,0}$ and the key $K_{S,\,2}$ is transmitted. Thus, the communication between the wireless base station 1 and the wireless terminal 2 can further be efficient.

In a similar manner, the wireless base station 1 can generate an A-MPDU in which the data frame F111, the additional information frame F112, and the data frame F113 of the sequence S+1 are aggregated, and broadcast the A-MPDU. Furthermore, the wireless base station 1 can generate an A-MPDU in which the data frame F116 and the additional information frame F117 of the sequence S+2 are aggregated, and broadcast the A-MPDU.

As can be understood from the above, according to the second variation of the present embodiment, by aggregating an additional information frame and a data frame (or data frames), the amount of data to be broadcasted can be reduced while security and credibility are maintained. Thus, a load in the transmission process of the wireless base station 1, traffic of the radio path, and a load in the reception process of the wireless terminal 2 can be reduced.

(Third Variation)

An example of a frame sequence transferred between the wireless base station 1 and the wireless terminal 2 of the third variation of the present embodiment will be explained with reference to FIG. 20. The wireless base station 1 of the third variation may broadcast multiple additional information frames in each sequence. An example of transfer of frames for each sequence be explained below.

The wireless base station 1 transmits eight frames F201 to F208 in a sequence S. Specifically, the wireless base station 1 transmits a head information frame F201 first in the sequence S, and then transmits data frames F202, F203 and F204, an additional information frame F205, a data frame F206, an additional information frame F207, and a data frame F208 sequentially. That is, the wireless base station 1 transmits the two additional information frames F205 and F207 in the sequence S.

Then, the wireless base station 1 transmits seven frames F209 to F215 in a sequence S+1. Specifically, the wireless base station 1 transmits a head information frame F209 first in the sequence S+1, and then transmits data frames F210, F211 and F212, an additional information frame F213, data frames F214 and F215, an additional information frame F207, and a data frame F208 sequentially.

If the wireless terminal 2 can receive any one of the additional information frame F205, the additional information frame F207, and the head information frame F209 in the above sequence S and the sequence S+1, the wireless terminal 2 can acquire three keys $K_{S,\,0}$, $K_{S,\,1}$ and $K_{S+1,\,5}$.

Figure 21:
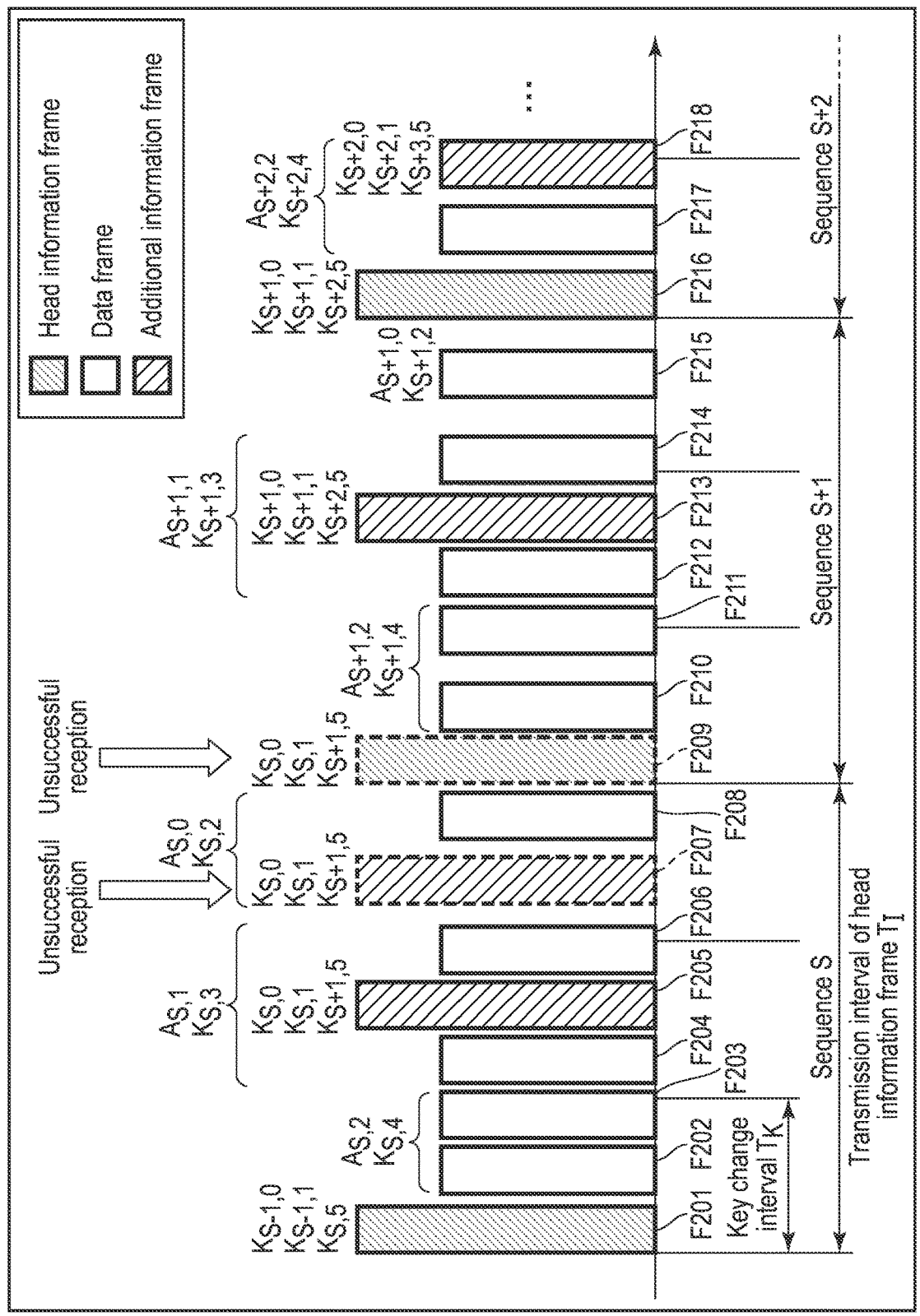
FIG. 21 is a diagram illustrating example where reception of a head information frame and reception of an additional information frame are not successful in the frame sequences of FIG. 20.

FIG. 21 illustrates an example of the frame sequence in a case where the reception of the additional information frame F205 is successful and the reception of the additional information frame F207 and the reception of the head information frame F209 are not successful.

(Sequence S)

(Head Information Frame F201, and Data Frames F202 and F203)

The operation for transmission of the frames F101 to F203 by the wireless base station 1 is the same as that for transmission of the frames F101 to F103 by the wireless base station 1 described above with reference to FIG. 8. Furthermore, the operation for reception of the frames F201 to F203 by the wireless terminal 2 is the same as that for reception of the frames F101 to F103 by the wireless terminal 2 described above with reference to FIG. 8.

(Data Frame F204, Additional Information Frame F205, and Data Frame F206)

The wireless base station 1 generates the authentication code $A_{S,1}$ using the key $K_{S,1}$ in the second key change interval $T_K$ in the sequence S. Then, the wireless base station 1 transmits the data frame F204, the additional information frame F205, and the data frame F206. Each of the frames F204, F205 and F206 includes the generated authentication code $A_{S,1}$ and the key $K_{S,3}$. The additional information frame F205 further includes the three keys $K_{S,0}$, $K_{S,1}$ and $K_{S+1,5}$. Note that, as in the above-mentioned second variation, the wireless base station 1 may transmit an A-MPDU in which the data frame F204, the additional information frame F205 and the data frame F206 are aggregated.

If the data fame F204 has been received, the wireless terminal 2 verifies the authenticity of the key $K_{S,3}$ in the data frame F204. The wireless terminal 2 can verify the authenticity of the key $K_{S,3}$ using the authenticity-confirmed key $K_{S,4}$ (or key $K_{S,5}$) that is located posterior to the key $K_{S,3}$ in the generation order.

If the authenticity of the key $K_{S,3}$ is confirmed, the wireless terminal 2 verifies the authenticity of the data frame F204 using the authenticity code $A_{S,1}$ in the data frame F204 and the authenticity-confirmed key $K_{S,1}$ corresponding to the authentication code $A_{S,1}$. At the time of receiving the data frame F204, the wireless terminal 2 does not receive a frame including the key $K_{S,1}$ from the wireless base station 1, and thus, cannot verify the authenticity of the data frame F204. Thus, the wireless terminal 2 buffers the data frame F204 in the RAM 23.

Then, the wireless terminal 2 receives the additional information frame F205. When receiving the additional information frame F205, the wireless terminal 2 can verify the authenticity of the additional information frame F205. The wireless terminal 2 verifies the authenticity of the additional information frame F205 using the public key of the wireless base station 1 with a certification by CA and the digital signature by the private key of the wireless base station 1 in the additional information frame F205. If the authenticity of the additional information frame F205 is confirmed, the wireless terminal 2 uses the three keys $K_{S,0}$, $K_{S,1}$ and $K_{S+1,5}$ included in the additional information frame F205 as authenticity-confirmed keys. If there is the authenticity-confirmed key $K_{S+1,5}$, the wireless terminal 2 can verify the authenticity of a data frame received in the sequence S+1 and the authenticity of an additional information frame received in the sequence S+1.

If the authenticity-confirmed key $K_{S,1}$ is acquired, the wireless terminal 2 can verify the authenticity of the buffered data frame F204 including the corresponding authentication code $A_{S,1}$. If the authenticity of the data frame F204 is confirmed, the wireless terminal 2 sends the data portion in the data frame F204 to the upper layer. That is, the wireless terminal 2 can acquire a correct data portion from the authenticity-confirmed data frame F204.

Furthermore, when receiving the additional information frame F205, the wireless terminal 2 verifies the authenticity of the key $K_{S,3}$ in the additional information frame F205. The wireless terminal 2 can verify the authenticity of the key $K_{S,3}$ in the additional information frame F205 using the authenticity-confirmed key $K_{S,4}$ (or key $K_{S,5}$) that is located posterior to the key $K_{S,3}$ in the generation order. The wireless terminal 2 stores the authenticity-confirmed key $K_{S,3}$.

Then, the wireless terminal 2 receives the data frame F206. As with the data frame F204, the wireless terminal 2 verifies the authenticity of the key $K_{S,3}$ included in the data frame F206. If the authenticity of the key $K_{S,3}$ is confirmed, the wireless terminal 2 verifies the authenticity of the data frame F206 using the authentication code $A_{S,1}$ in the data frame F206, and the authenticity-confirmed key $K_{S,1}$. Then, the wireless terminal 2 can send the data portion in the authenticity-confirmed data frame F206 to the upper layer.

(Additional Information Frame F207 and Data Frame F208)

The wireless base station 1 generates the authentication code $A_{S,0}$ using the key $K_{S,0}$ in the third key change interval $T_K$ in the sequence S. Then, the wireless base station 1 transmits the additional information frame F207 and the data frame F208. Each of the frames F207 and F208 includes the generated authentication code $A_{S,0}$ and the key $K_{S,2}$. The additional information frame F207 further includes the three keys $K_{S,0}$, $K_{S,1}$ and $K_{S+1,5}$. Note that, as in the above-mentioned second variation, the wireless base station 1 may transmit an A-MPDU in which the additional information frame F207 and data frame F208 are aggregated.

The wireless terminal 2 is configured to receive the additional information frame F207; however, the reception is not successful. Thus, the wireless terminal 2 cannot acquire the keys $K_{S,2}$, $K_{S,0}$, $K_{S,1}$ and $K_{S+1,5}$ included in the additional information frame F207.

Then, the wireless terminal 2 receives the data frame F208. The wireless terminal 2 verifies the authenticity of the key $K_{S,2}$ included in the data frame F208. If the authenticity of the key $K_{S,2}$ is confirmed, the wireless terminal 2 verifies the authenticity of the data frame F208 using the authentication code $A_{S,0}$ in the data frame F208, and the authenticity-confirmed key $K_{S,0}$. Then, the wireless terminal 2 can send the data portion in the authenticity-confirmed data frame F208 to the upper layer.

If the authenticity-confirmed key $K_{S,2}$ is acquired, the wireless terminal 2 can verify the authenticity of the buffered data frames F202 and F203 each including the corresponding authentication code $A_{S,2}$. If the authenticity of the data frame F202 is confirmed, the wireless terminal 2 sends the data portion in the data frame F202 to the upper layer. If the authenticity of the data frame F203 is confirmed, the wireless terminal 2 sends the data portion in the data frame F203 to the upper layer.

(Sequence S+1)

The wireless base station 1 transmits the head information frame F209 including the three keys $K_{S,0}$, $K_{S,1}$ and $K_{S+1,5}$.

The wireless terminal 2 is configured to receive the head information frame F209; however, the reception is not successful. Thus, the wireless terminal 2 cannot acquire the keys $K_{S,0}$, $K_{S,1}$ and $K_{S+1,5}$ included in the head information frame F209.

However, the wireless terminal 2 received the additional information frame F205 in the previous sequence S, and acquired the authenticity-confirmed key $K_{S+1,5}$. Thus, even if the reception of the head information frame F209 is not successful, the wireless terminal 2 can verify, using the key $K_{S+1,5}$ acquired from the additional information frame F205, the authenticity of the key $K_{S+1,4}$ in the data frames F210 and F211, the authenticity of the key $K_{S+1,4}$ in the data frames F212 and F214 and the additional information frame F213, and the authenticity of the key $K_{S+1,2}$ in the data frame F215. Furthermore, the wireless terminal 2 can acquire, from the additional information frame F213 including the authenticity-confirmed key $K_{S+1,3}$, the authenticity-confirmed keys $K_{S+1,0}$, $K_{S+1,1}$ and $K_{S+2,5}$. Thus, the wireless terminal 2 can acquire the data portions from the data frames F210 to F212, F214 and F215 including the authentication codes $A_{S+1, 2}$, $A_{S+1, 1}$ and $A_{S+1, 0}$ that correspond to the keys $K_{S+1, 2}$, $K_{S+1, 1}$ and $K_{S+1, 0}$, respectively.

The specific operation for reception of the frames F210 to F215 by the wireless terminal 2 is the same as that for reception of the frames F109 to F114 by the wireless terminal 2 described above with reference to FIG. 9.

As can be understood from the above, in the third variation of the present embodiment, the wireless base station 1 may transmit additional information frames multiple times in the single sequence S (that is, transmit multiple additional information frames F205 and F207). Thus, even if the reception of the additional information frame F207 and the reception of the head information frame F209 are not successful, the wireless terminal 2 may use the key $K_{S+1, 5}$ acquired from another additional information frame F205, thereby acquiring the data portion from the following data frames F210 to F212, F214 and F215, and acquiring the keys $K_{S+1, 0}$, $K_{S+1, 1}$ and $K_{S+2, 5}$ from the additional information frame F213. Thus, in the sequence S+1, a possibility that a data portion can be transferred from the wireless base station to the wireless terminal 2 can further be increased.

As can be understood from the above, according to the present embodiment, a possibility that data is transferred correctly can be increased. The transmitter 12 of the wireless base station 1 transmits, in a first period, a first information frame (head information frame) with broadcasting. The first information frame includes first verification information and a first key usable in the first period. The transmitter 12 transmits, in the first period and after transmitting the first information frame, a data frame including first data with broadcasting. The transmitter 12 transmits, in the first period and after transmitting the first information frame, a second information frame (additional information frame) with broadcasting. The second information frame includes a fourth key usable in a second period following the first period. The transmitter 12 transmits, in the second period, a third information frame (head information frame) with broadcasting. The third information frame includes third verification information and the fourth key.

The receiver 22 of the wireless terminal 2 receives, in the first period, the first information frame including the first verification information and the first key usable in the first period. The receiver 22 receives, in the first period and after receiving the first information frame, a first data frame including the first data. The receiver 22 receives, in the first period and after receiving the first information frame, the second information frame including the fourth key usable in the second period following the first period. The receiver 22 receives, in the second period, the third information frame including the third verification information and the fourth key.

Therefore, even if the wireless terminal 2 fails to receive the third information frame, data can be transferred from the wireless base station 1 to the wireless terminal 2 correctly in the second period using the fourth key in the second information frame. Thus, a possibility that data is correctly transferred from the wireless base station 1 to the wireless terminal 2 can be increased.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a transmitter configured to:
  transmit, in a first period, a first information frame with broadcasting, the first information frame including first verification information and a first key usable in the first period;
  transmit, in the first period and after transmitting the first information frame, a data frame including first data with broadcasting;
  transmit, in the first period and after transmitting the first information frame, a second information frame with broadcasting, the second information frame including a fourth key usable in a second period following the first period; and
  transmit, in the second period, a third information frame with broadcasting, the third information frame including third verification information and the fourth key,
wherein:
the data frame further includes a second key from which the first key is derivable,
the second information frame further includes a third key from which the first key is derivable,
the wireless communication apparatus further comprises a controller configured to:
  generate first authentication information using a sixth key from which the first key and the second key are derivable; and
  generate second authentication information using a seventh key from which the first key and the third key are derivable,
the data frame further includes the first authentication information, and
the second information frame further includes the second authentication information.

2. The wireless communication apparatus claim 1, wherein:
the first verification information includes information to verify authenticity of the first information frame,
the third verification information includes information to verify authenticity of the third information frame, and
the second information frame further includes second verification information to verify authenticity of the second information frame.

3. The wireless communication apparatus of claim 1, wherein:
the first information frame further includes first period information related to the first period,
the second information frame further includes second period information related to the second period, and the third information frame includes neither the first period information nor the second period information.

4. The wireless communication apparatus of claim 1, wherein the second key is identical to the third key.

5. The wireless communication apparatus of claim 1, wherein the transmitter is further configured to transmit, in the first period and after transmitting the first information frame with broadcasting, a fourth information frame including the fourth key with broadcasting.

6. The wireless communication apparatus of claim 1, wherein the second key is derivable from the third key if the second information frame is transmitted with broadcasting after the data frame is transmitted with broadcasting.

7. The wireless communication apparatus of claim 1, wherein the third key is derivable from the second key if the data frame is transmitted with broadcasting after the third information frame is transmitted with broadcasting.

8. A wireless communication apparatus comprising:
a receiver configured to:
receive, in a first period, a first information frame including first verification information and a first key usable in the first period;
receive, in the first period and after receiving the first information frame, a first data frame including first data;
receive, in the first period and after receiving the first information frame, a second information frame including a fourth key usable in a second period following the first period; and
receive, in the second period, a third information frame including third verification information and the fourth key,
wherein:
the first data frame further includes a second key from which the first key is derivable and first authentication information generated using a sixth key from which the first key and the second key are derivable, and
the second information frame further includes a third key from which the first key is derivable and second authentication information generated using a seventh key from which the first key and the third key are derivable.

9. The wireless communication apparatus of claim 8, wherein the second verification information comprises information to verify authenticity of the second information frame, and
wherein the wireless communication apparatus further comprises a controller configured to:
verify, if the first information frame is received, authenticity of the first key in the first information frame using the first verification information;
verify, if the second information frame is received, authenticity of the fourth key in the second information frame using the second verification information; and
verify, if the third information frame is received, authenticity of the fourth key in the third information frame using the third verification information.

10. The wireless communication apparatus of claim 9, wherein:
the receiver is further configured to receive, in the second period, a second data frame including a fifth key and second data, and
the controller is further configured to verify, if the authenticity of the fourth key in the second information frame is confirmed, authenticity of the fifth key using the fourth key in the second information frame.

11. The wireless communication apparatus of claim 10, wherein the controller is further configured to:
verify authenticity of the fourth key in the third information frame using the third verification information;
verify, if the authenticity of the fourth key in the third information frame is confirmed, authenticity of the fifth key using the fourth key in the third information frame; and
verify, if the authenticity of the fourth key in the third information frame is not confirmed and the authenticity of the fourth key in the second information frame is confirmed, authenticity of the fifth key using the fourth key in the second information frame.

12. The wireless communication apparatus of claim 9, wherein:
the receiver is further configured to receive, in the second period, a second data frame including a fifth key and second data, and
the controller is configured to verify, if reception of the third information frame is not successful and the authenticity of the fourth key in the second information frame is confirmed, authenticity of the fifth key using the fourth key in the second information frame.

13. The wireless communication apparatus of claim 8, wherein:
the first information frame further includes first period information related to the first period, the third information frame further includes second period information related to the second period, and
the second information frame includes neither the first period information nor the second period information.

14. The wireless communication apparatus of claim 8, wherein the second key is identical to the third key.

15. The wireless communication apparatus of claim 8, wherein:
the receiver is further configured to:
receive, in the first period and after receiving the first information frame, a fourth information frame including the fourth key; and
receive, in the second period, a second data frame including a fifth key and second data, and
the wireless communication apparatus further comprises a controller configured to:
verify authenticity of the third key using the first key if authenticity of the first key is confirmed; and
verify authenticity of the fifth key using the fourth key in the second information frame if the authenticity of the third key is confirmed, and reception of the third information frame and reception of the fourth information frame are not successful.

16. The wireless communication apparatus of claim 8, wherein:
the first authentication information is generated using the seventh key from which the first key, the second key, and the third key are derivable,
the second verification information is usable for verifying authenticity of the second information frame,
the receiver is configured to receive the second information frame after receiving the first data frame, and
the wireless communication apparatus further comprises a controller configured to:
verify authenticity of the seventh key using the second verification information;
generate second authentication information using the seventh key if the authenticity of the seventh key is confirmed; and determine that authenticity of the first data is confirmed if the first authentication information matches the second authentication information.

17. A method comprising:
transmitting, in a first period, a first information frame with broadcasting, the first information frame including first verification information and a first key usable in the first period;
transmitting, in the first period and after transmitting the first information frame, a data frame including first data with broadcasting;
transmitting, in the first period and after transmitting the first information frame, a second information frame with broadcasting, the second information frame including a fourth key usable in a second period following the first period; and
transmitting, in the second period, a third information frame with broadcasting, the third information frame including third verification information and the fourth key,
wherein:
the data frame further includes a second key from which the first key is derivable,
the second information frame further includes a third key from which the first key is derivable,
the method further comprises:
generating first authentication information using a sixth key from which the first key and the second key a re derivable; and
generating second authentication information using a seventh key from which the first key and the third key are derivable,
the data frame further includes the first authentication information, and
the second information frame further includes the second authentication information.

18. A method comprising:
receiving, in a first period, a first information frame including first verification information and a first key usable in the first period;
receiving, in the first period and after receiving the first information frame, a first data frame including first data;
receiving, in the first period and after receiving the first information frame, a second information frame including a fourth key usable in a second period following the first period; and
receiving, in the second period, a third information frame including third verification information and the fourth key,
wherein:
the first data frame further includes a second key from which the first key is derivable and first authentication information generated using a sixth key from which the first key and the second key are derivable, and
the second information frame further includes a third key from which the first key is derivable and second authentication information generated using a seventh key from which the first key and the third key are derivable.

19. A wireless communication apparatus comprising:
a transmitter configured to:
transmit, in a first period, a first information frame with broadcasting, the first information frame including first verification information and a first key usable in the first period;
transmit, in the first period and after transmitting the first information frame, a first data frame including first data with broadcasting;
transmit, in the first period and after transmitting the first information frame, a second information frame with broadcasting, the second information frame including a fourth key usable in a second period following the first period; and
transmit, in the second period, a third information frame with broadcasting, the third information frame including third verification information and the fourth key,
wherein:
the first verification information includes information to verify authenticity of the first information frame,
the second information frame further includes second verification information to verify authenticity of the fourth key in the second information frame,
the third verification information includes information to verify authenticity of the fourth key in the third information frame,
the transmitter further transmits, in the second period, a second data frame including a fifth key and second data, and
the fourth key in the second information frame is used to verify authenticity of the fifth key, if the authenticity of the fourth key in the second information frame is confirmed.

20. A wireless communication apparatus comprising:
a receiver configured to:
receive, in a first period, a first information frame including first verification information and a first key usable in the first period;
receive, in the first period and after receiving the first information frame, a first data frame including first data;
receive, in the first period and after receiving the first information frame, a second information frame including a fourth key usable in a second period following the first period; and
receive, in the second period, a third information frame including third verification information and the fourth key,
wherein:
the second information frame further includes second verification information to verify authenticity of the second information frame,
the wireless communication apparatus further comprises a controller configured to:
verify, if the first information frame is received, authenticity of the first key in the first information frame using the first verification information;
verify, if the second information frame is received, authenticity of the fourth key in the second information frame using the second verification information; and
verify, if the third information frame is received, authenticity of the fourth key in the third information frame using the third verification information,
the receiver is further configured to receive, in the second period, a second data frame including a fifth key and second data, and
the controller is further configured to verify, if the authenticity of the fourth key in the second information frame is confirmed, authenticity of the fifth key using the fourth key in the second information frame.

21. A wireless communication apparatus comprising:
a transmitter configured to:
 transmit, in a first period, a first information frame with broadcasting, the first information frame including first verification information and a first key usable in the first period;
 transmit, in the first period and after transmitting the first information frame, a data frame including first data with broadcasting;
 transmit, in the first period and after transmitting the first information frame, a second information frame with broadcasting, the second information frame including a fourth key usable in a second period following the first period; and
 transmit, in the second period, a third information frame with broadcasting, the third information frame including third verification information and the fourth key,
wherein:
the first verification information includes information to verify authenticity of the first information frame,
the second information frame further includes second verification information to verify authenticity of the fourth key in the second information frame,
the third verification information includes information to verify authenticity of the fourth key in the third information frame,
the transmitter further transmits, in the second period, a second data frame including a fifth key and second data, and
the fourth key in the second information frame is used to verify authenticity of the fifth key, if reception of the transmitted third information frame is not successful and the authenticity of the fourth key in the second information frame is confirmed.

22. A wireless communication apparatus comprising:
a receiver configured to:
 receive, in a first period, a first information frame including first verification information and a first key usable in the first period;
 receive, in the first period and after receiving the first information frame, a first data frame including first data;
 receive, in the first period and after receiving the first information frame, a second information frame including a fourth key usable in a second period following the first period; and
 receive, in the second period, a third information frame including third verification information and the fourth key,
wherein:
the second information frame further includes second verification information to verify authenticity of the second information frame,
the wireless communication apparatus further comprises a controller configured to:
 verify, if the first information frame is received, authenticity of the first key in the first information frame using the first verification information;
 verify, if the second information frame is received, authenticity of the fourth key in the second information frame using the second verification information; and
 verify, if the third information frame is received, authenticity of the fourth key in the third information frame using the third verification information,
the receiver is further configured to receive, in the second period, a second data frame including a fifth key and second data, and
the controller is configured to verify, if reception of the third information frame is not successful and the authenticity of the fourth key in the second information frame is confirmed, authenticity of the fifth key using the fourth key in the second information frame.

23. A wireless communication apparatus comprising:
a transmitter configured to:
 transmit, in a first period, a first information frame with broadcasting, the first information frame including first verification information and a first key usable in the first period;
 transmit, in the first period and after transmitting the first information frame, a data frame including first data with broadcasting;
 transmit, in the first period and after transmitting the first information frame, a second information frame with broadcasting, the second information frame including a fourth key usable in a second period following the first period; and
 transmit, in the second period, a third information frame with broadcasting, the third information frame including third verification information and the fourth key,
wherein:
the second information frame further includes a third key from which the first key is derivable,
the transmitter is further configured to transmit, in the first period and after transmitting the first information frame, a fourth information frame including the fourth key,
the transmitter is further configured to transmit, in the second period, a second data frame including a fifth key and second data,
authenticity of the third key is verified using the first key if authenticity of the first key is confirmed, and
authenticity of the fifth key is verified using the fourth key in the second information frame if the authenticity of the third key is confirmed, and reception of the transmitted third information frame and reception of the transmitted fourth information frame are not successful.

24. A wireless communication apparatus comprising:
a receiver configured to:
 receive, in a first period, a first information frame including first verification information and a first key usable in the first period;
 receive, in the first period and after receiving the first information frame, a first data frame including first data;
 receive, in the first period and after receiving the first information frame, a second information frame including a fourth key usable in a second period following the first period; and
 receive, in the second period, a third information frame including third verification information and the fourth key,
wherein:
the second information frame further includes a third key from which the first key is derivable,
the receiver is further configured to:
 receive, in the first period and after receiving the first information frame, a fourth information frame including the fourth key; and receive, in the second period, a second data frame including a fifth key and second data, and the wireless communication apparatus further comprises a controller configured to:

verify authenticity of the third key using the first key if authenticity of the first key is confirmed; and verify authenticity of the fifth key using the fourth key in the second information frame if the authenticity of the third key is confirmed, and reception of the third information frame and reception of the fourth information frame are not successful.

\* \* \* \* \*